United States Patent
Miller et al.

(10) Patent No.: US 12,218,965 B2
(45) Date of Patent: Feb. 4, 2025

(54) AUTOMATED PRODUCT UPDATE MANAGEMENT IN MANAGED NETWORKS

(71) Applicant: Ivanti, Inc., South Jordan, UT (US)

(72) Inventors: Brent Miller, Minnetonka, MN (US); Mitch Berg, Saint Paul, MN (US); Brian Secrist, Minneapolis, MN (US)

(73) Assignee: Ivanti, Inc., South Jordan, UT (US)

( * ) Notice: Subject to any disclaimer, the term of this patent is extended or adjusted under 35 U.S.C. 154(b) by 431 days.

(21) Appl. No.: 17/674,043

(22) Filed: Feb. 17, 2022

(65) Prior Publication Data

US 2022/0263854 A1 Aug. 18, 2022

Related U.S. Application Data

(60) Provisional application No. 63/150,970, filed on Feb. 18, 2021.

(51) Int. Cl.
*H04L 9/40* (2022.01)
*G06F 8/65* (2018.01)
*G06F 8/70* (2018.01)

(52) U.S. Cl.
CPC ............ *H04L 63/1433* (2013.01); *G06F 8/65* (2013.01); *G06F 8/70* (2013.01)

(58) Field of Classification Search
CPC ....... H04L 63/1433; H04L 63/20; G06F 8/65; G06F 8/70; G06F 2221/034; G06F 21/577; G06Q 10/06; G06Q 10/20
See application file for complete search history.

(56) References Cited

U.S. PATENT DOCUMENTS

| | | | | |
|---|---|---|---|---|
| 9,985,847 | B2 * | 5/2018 | Tung | G06F 11/3442 |
| 2007/0192453 | A1 * | 8/2007 | Copeland | H04L 12/66 709/223 |
| 2009/0138315 | A1 | 5/2009 | Schroeder | |
| 2009/0254572 | A1 * | 10/2009 | Redlich | G06Q 10/10 |
| 2012/0078410 | A1 | 3/2012 | Wong et al. | |
| 2016/0080421 | A1 * | 3/2016 | Hou | H04L 41/0806 726/1 |
| 2017/0142157 | A1 | 5/2017 | Cao et al. | |
| 2021/0232755 | A1 * | 7/2021 | Jadhav | G06Q 10/20 |
| 2021/0281609 | A1 * | 9/2021 | Crabtree | H04L 63/1425 |
| 2022/0229657 | A1 * | 7/2022 | Hussain | H04L 41/0895 |
| 2023/0171166 | A1 * | 6/2023 | Berg | G06F 21/577 709/224 |

OTHER PUBLICATIONS

International Search Report and Written Opinion for Application No. PCT/US2022/016863, dated May 24, 2022, 11 pages.

* cited by examiner

*Primary Examiner* — John B King

(57) ABSTRACT

An embodiment includes a method of vulnerability detection and mitigation in a managed network. The method includes receiving a defined state of a product on a managed endpoint of a managed network. The method includes detecting a trigger event in the managed network. The trigger event is indicative of a change to the managed device or to the product that is inconsistent with the defined state. Responsive to detection of the trigger event, the method includes automatically implementing a product modification process. The product modification process includes distribution of at least one product update to a product installed at the managed endpoint.

19 Claims, 9 Drawing Sheets

| Report Set 902 | Compliance Score 904 | Group Compliance History 906 |
|---|---|---|
| ☐ Data Centers with External Connector | 15% | 1-1-2022 |
| ☐ Entire Network – Patch Tuesday | 80% | 10-1-2021 |
| ☐ R and D – Critical and Security | 76% | 3-1-2021 |
| ☐ Romania | 50 % | 1-1-2021 |

AUTOMATED PRODUCT UPDATE MANAGEMENT IN MANAGED NETWORKS

CROSS-REFERENCE TO RELATED APPLICATION

This application claims priority to and the benefit of U.S. Provisional Application No.: 63/150,970 filed Feb. 18, 2021, which is incorporated herein by reference in its entirety.

FIELD

The embodiments described in this disclosure are related to automated product update management in managed networks, and in particular to implementation of product modifications responsive to defined trigger events.

BACKGROUND

In enterprise and other managed networks, endpoints refer to computing devices that are integrated into the network and that are in communication with a management device. The management device may include a server device, for instance, which has visibility to operating parameters and state parameters of the endpoints. Based on information communicated between the management device and the endpoints, the management device may detect issues at the endpoints, deploy solutions to the endpoints, update software on the endpoints, troubleshoot issues at the endpoints, provision roles and security controls to the endpoints, etc.

One element of the managed networks is coordination and distribution of product updates. This operation is sometimes referred to as patch management. The updates or patches generally include code changes and modifications to products on the endpoints or some subset thereof. The products that are updated include software applications, software tools, operating systems, and the like. Distribution of the updates is important to ensure the products are properly functioning and to ensure cybersecurity vulnerabilities are addressed.

In some conventional patch management systems, an administrator manually runs a scan of the endpoints. The scan detects products that are unpatched or out-of-date on one or more of the endpoints. The identified products may then be communicated to the management system that distributes an updated product to the endpoints.

An issue with these conventional patch management systems is that considerable resources are expended by manual implementation of the scan. Additionally, the scan in the conventional systems may be limited to known products on the endpoints. For instance, one of the endpoints might have an up-to-date version of a first product. However, the endpoint may have installed a second product that performs a substantially similar function to the first product. The second product may not be known to the administrator. Thus it may not be included in the scan. Accordingly, the second product might introduce a vulnerability into the network or endpoint and the product may persist in an unpatched state.

The subject matter claimed herein is not limited to embodiments that solve any disadvantages or that operate only in environments such as those described. Rather, this background is only provided to illustrate one example technology area where some embodiments described herein may be practiced.

SUMMARY

An aspect of an embodiment includes a method of endpoint management. In particular, the embodiment may include product management at endpoints in a managed network. The product management may be based on defined states and trigger event detection. The defined states may include a set of criteria or conditions established for the endpoints or the managed network. The trigger events may include a circumstance in the managed network or an associated cloud network that indicates an inconsistency with the defined state. The method may include automatic implementation of a product modification process responsive to detection of the trigger events. The product modification process is configured to restore the endpoint or a set of endpoints to the defined state. The method may change the overall structure of conventional patch systems. In particular, definition of the defined states creates the circumstances that trigger the product modification process. Accordingly, systems implementing the method may remove manual scan processes and may trigger the product modification process based on a diverse set of trigger events.

Another aspect of an embodiment may include a method of vulnerability detection and mitigation in a managed network. The method may include receiving a defined state or data indicative of the defined state. The defined state may be associated with one or more products (e.g., operating systems, software applications, stored data, etc.). The products may be installed on managed endpoints of a managed network. The defined state may include one or more characteristics or conditions of the products such as a product update status, a product being removed or not present on the endpoint, a product version preference, a preferred product being installed at the managed endpoint, a vendor update installation status, another suitable condition or constraint, or some combination thereof. The method may include detecting a trigger event. The trigger event may be detected on one or more computing systems such as the components of the managed network or in another computing system communicatively coupled to the managed network. The trigger event may be indicative of a change to the managed endpoint or to the product that is inconsistent with the defined state. Detection of the trigger event may include monitoring a software management interface that documents product inventory of the managed network in some instances. Additionally or alternatively, the detection the trigger event may include communication with a kernel driver or an agent installed at the managed endpoint. The kernel driver or the agent may be configured to monitor software inventory changes at the managed endpoint. The kernel driver may report information related to the trigger event.

The method may be performed at least partially in a cloud network. In these and other embodiments, the trigger event may be detected in a portion of the cloud network that is not associated with the managed network. For instance, the trigger event may be detected in a portion of the cloud network associated with another managed network, a third-party server, a vendor server, another source, or some combination thereof. Some examples of the trigger event may include an update to content or to the product, an indication of whether or not a storage device (e.g., portable and/or removable storage devices) is attached, changes to specific storage locations or specific files, a notification by a service in a cloud network that is pushed to the managed endpoint, the notification indicating that content has been updated, an update published to a patch catalog, a boot or reboot (e.g., of an endpoint 106), a particular period of time (e.g., 1, 2, or 3 days) without a reboot, an upcoming deployment of a patch update (e.g., one hour before), an upcoming staging, an upcoming upload of critical content, an unauthorized change to a software inventory of the managed endpoint in the managed network, an unauthorized change to a software inventory of an additional managed endpoint having a similar defined state, another event indicating an inconsistency with the defined state, or some combination thereof. The method may include automatically implementing a product modification process. The product modification process may include distribution of at least one product update to a first product installed at the managed endpoint. The product update may include a patch, version update, vulnerability fix, and the like. Additionally or alternatively, the product modification process may be configured to remove an installed product, replace an installed product, change to a setting or feature on an installed product, etc.

The method may include one or more scan operations and an additional, related product modification process. For instance, a local scan of the managed endpoint may be initiated. The local scan may be performed at the managed endpoint relative to one or more other products installed thereon. The local scan may be performed to identify outstanding patches and vulnerabilities or other inconsistencies with the defined state relative to the other products. The method may then include implementation of the product modification process responsive to identification of an outstanding patches or vulnerabilities during the local scan or responsive to other inconsistencies with the defined state. Additionally, the method may include initiating a network scan of additional managed endpoints of the managed network. The network scan might be configured to identify one or more of the additional managed endpoints with defined states that are similar or substantially similar to the defined state of the managed endpoint. The product modification process may be automatically implemented at the additional managed endpoints. Additionally still, the method may include initiating a global scan of additional managed networks hosted on the cloud network. The global scan may be configured to identify presence of the trigger event or one or more outstanding patches and vulnerabilities in the additional managed networks. The product modification process may be implemented at any additional networks responsive to identification of the presence of the trigger event, outstanding patches, or vulnerabilities.

An additional aspect of an embodiment includes a non-transitory computer-readable medium having encoded therein programming code executable by one or more processors to perform or control performance at least a portion of the methods described above.

Yet another aspect of an embodiment includes a computer device. The computer device may include one or more processors and a non-transitory computer-readable medium. The non-transitory computer-readable medium has encoded therein programming code executable by the one or more processors to perform or control performance of one or more of the operations of the methods described above.

A further aspect of an embodiment includes a system configured for automated product management. The system may include a communication network, two or more managed endpoints, and a device. The device may include one or more processors and a non-transitory computer-readable medium. The non-transitory computer-readable medium may have encoded therein programming code executable by one or more processors to perform or control performance of one or more of operations of the methods described above. In the system, the device may be different types of computing devices. For instance, the device may include a management device in the managed network. Additionally or alternatively, the device may include a cloud server.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 9 depicts a block diagram of a portion of a user interface in which compliance data such as the compliance data of FIG. 4 may be displayed, all according to at least one embodiment described in the present disclosure.

DESCRIPTION OF SOME EXAMPLE EMBODIMENTS

Figure 1:
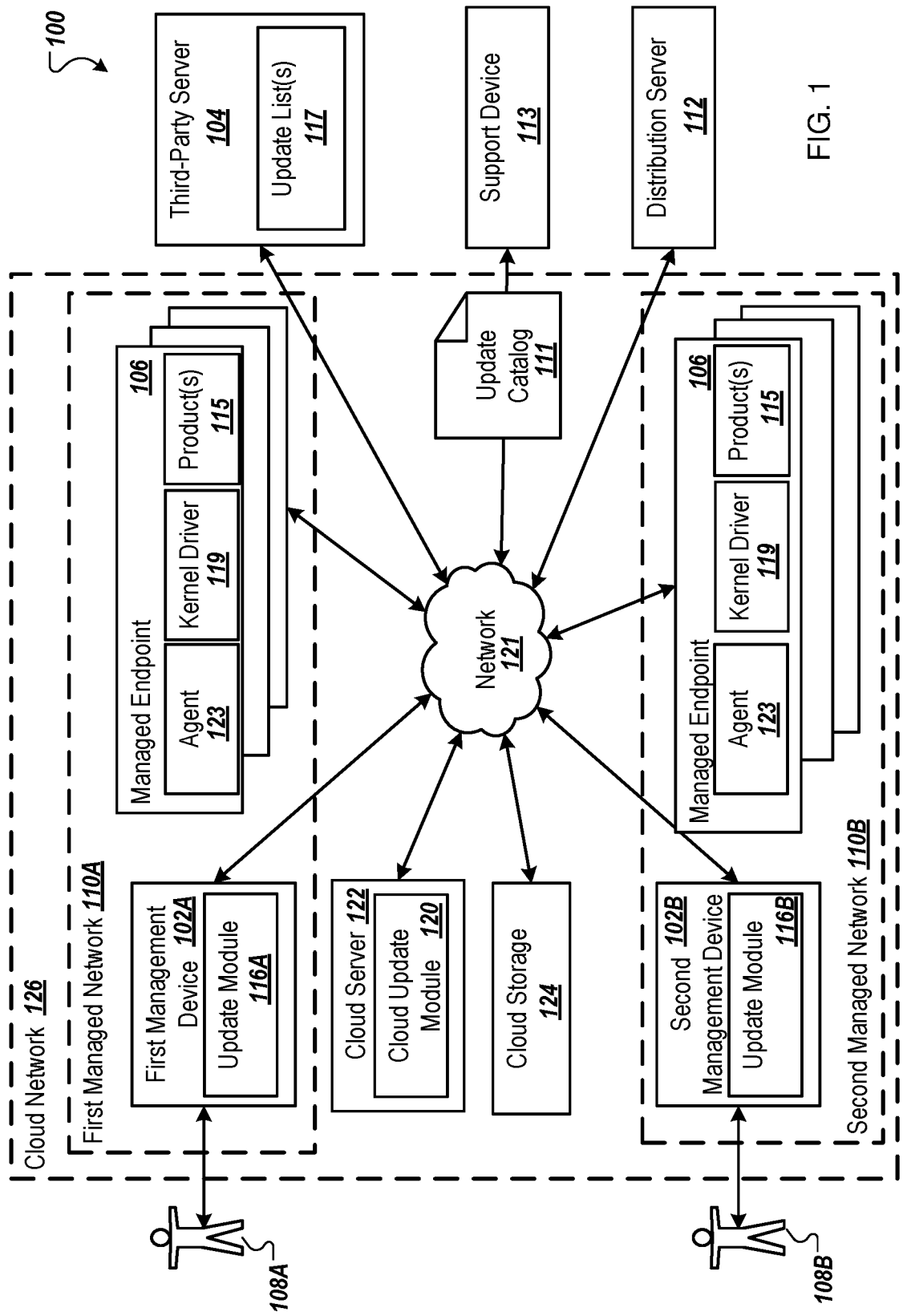
FIG. 1 depicts a block diagram of an example operating environment in some embodiments described in the present disclosure may be implemented.

The embodiments described in this disclosure are related to automated product management in managed networks. Some embodiments include automated implementation of a product modification process responsive to scans performed responsive to defined trigger events that occur throughout a managed network or a cloud network. For example, some embodiments include systems and methods of product management at endpoints in one or more managed networks. The product management may be based on the defined states and trigger event detection. The defined states may include a constraints, conditions, or configurations to be maintained in the one or more managed networks. The defined states may be generated for one or more components (e.g., endpoints or network apparatus), groups of components, products of the managed network, or the cloud network. The trigger events may correspond to the defined states. For instance, the trigger events may include any circumstance in the managed network or an associated cloud network that indicates an inconsistency with the defined states. A product modification process may be automatically implemented responsive to detection of the trigger events. The product modification process is configured to restore or at least partially restore an endpoint, a product, or a set of endpoints to the defined state.

The systems and methods described in the present disclosure may change the overall structure of conventional patch systems. For instance, in some conventional patch management systems, an administrator manually runs a scan of the endpoints. The administrator may receive a notice of a vulnerability or update to a product in a managed network. The scan detects products and endpoints that are affected by the vulnerability or subject to the update. The administrator may then take steps to communicate a patch or modified computer code to the identified endpoints. Considerable resources are expended by manual scan and implementation of the patch update. Additionally, the scan in the conventional systems may be limited to known products on the endpoints. For instance, one of the endpoints might have an up-to-date version of a first product. However, a user of the endpoint may have installed a second product that performs a substantially similar function to the first product. The second product may not be known to the administrator. Thus the second product may be overlooked during the scan. Accordingly, the second product might introduce a vulnerability into the systems while persisting in an unpatched state.

These limitations of conventional systems may be overcome by some embodiments of the present disclosure. For instance, generation of the defined states creates the circumstances that trigger the product modification process. The product modification processes may be automated after the defined states are generated. Accordingly, systems implementing embodiments of the present disclosure may reduce or cease manual scan operations and manual review of patch updates. Additionally, the defined states of some embodiments may enable precise and diverse criteria on which product modification processes are implemented.

These and other embodiments are described with reference to the appended Figures in which like item numbers indicate like function and structure unless described otherwise. The configurations of the present systems and methods, as generally described and illustrated in the Figures herein, may be arranged and designed in different configurations. Thus, the following detailed description of the Figures, is not intended to limit the scope of the systems and methods, as claimed, but is merely representative of example configurations of the systems and methods.

FIG. 1 is a block diagram of an example operating environment 100 in which some embodiments of the present invention can be implemented. The operating environment 100 may be configured for implementation of endpoint management in managed networks 110A and 110B (generally, managed network 110 or managed networks 110). In particular, the operating environment 100 is configured for management of products 115 at the managed endpoints 106 (hereinafter, endpoint 106 or endpoints 106) in the managed networks 110. The management of the products 115 may enable product updates such as software patches and code changes to be accessed, consumed, and distributed to the endpoints 106. Additionally, the management of the products 115 may include controlling which products 115 are installed at the endpoints 106, restrictions to functions of the products 115, and the like.

The operating environment 100 of FIG. 1 includes a cloud network 126. The cloud network 126 includes one or more remote servers such as the cloud server 122 that is communicatively coupled to the managed networks 110 via the network 121. The cloud network 126 may enable a remote management and storage of data and information related to the endpoints 106.

Some embodiments of the endpoint management may be performed in a managed network (e.g., 110) that is not included in or communicatively coupled to the cloud network 126. For instance, the managed network 110 may implement an "on premises" solution, which may be implemented within the managed network 110 independently of the cloud server 122.

In the managed networks 110, the products 115 may be managed based on defined states. For instance, an administrator 108A or 108B (generally, administrator 108 or administrators 108) may provide input that is suitable to define a set of constraints and conditions for one or more of the products 115. In the present disclosure, this set of constrains and conditions is referred to as a "defined state." A management device 102A or 102B (generally, management device 102 or management devices 102) or the cloud server 122 may then monitor the cloud network 126 or portions thereof (e.g., one of the managed networks 110) for trigger events. The trigger events include a circumstance that is detected indicating the products 115 or the endpoints 106 are inconsistent with the defined state. Responsive to detection of the trigger event, the management device 102 or the cloud server 122 may implement a product modification. The product modification may change one or more of the products 115 to bring the products 115 in conformity with the defined state.

For example, the defined state may be an update status of a first product of the products 115. The update status may include maintaining the first product in an up-to-date status (e.g., a most recent or current version of the product is operating at the endpoint 106). In this example, the trigger event that corresponds to the defined state may include receipt or detection of a CVE or a product update (which may originate at a support device 113 or a third-party server 104, for instance). The management device 102 or the cloud server 122 may detect the CVE or the product update associated with the first product. In response, the management device 102 or the cloud server may modify the first product by implementing a patch or a product update. For example, the management device 102 or the cloud server 122 may communicate the patch or the product update or a suitable patch package to the endpoint 106. The endpoint 106 may then modify the first product to incorporate the patch or product update. The modification to the first product may be implemented automatically, without action by the administrator 108. Additionally, the detection of the trigger event might initiate scans of the endpoint 106, other endpoints 106 in the managed network 110, other managed networks 110, an entire cloud network 126, or combinations thereof. The scan may be configured to detect additional trigger events and implement modification processes to ensure compliance with the defined state(s).

In another example, the defined state may include a particular product not being (or required to be) installed on the endpoint 106. A corresponding trigger event may include a notification that the particular product has been installed (or removed from) the endpoint 106. In some embodiments, a kernel driver 119 or an agent 123 may communicate or report inventory information related to the products 115 to the management device 102 or the cloud server 122. Responsive to detection of the particular product at the endpoint 106, the management device 102 or the cloud server 122 may implement a product modification process. For instance, the management device 102 or the cloud server 122 might remove the particular product, disable the particular product, notify a user of the managed endpoint, or some combination thereof. As in the previous example, the modification to the particular product may be implemented automatically, without action by the administrator 108. Additionally, the detection of the trigger event might initiate the scans described above to detect additional trigger events and/or to ensure compliance with the defined state(s).

Embodiments of the present disclosure provide a technical improvement to conventional patch management systems. For instance, in some conventional patch management systems, endpoints are managed using published product updates. An administrator may review the public product updates and publish outstanding product updates that have not been implemented at the endpoints such that these outstanding product updates may be distributed to endpoints. The administrator is involved in most or all of the product updates and may not have visibility regarding the products at the endpoints when the products are not installed by the management device 102. Thus, these conventional patch management systems may suffer from inefficiencies resulting from a constant involvement and monitoring of the products and incomplete knowledge regarding the products at the endpoints.

For instance, there might be a delay in implementation of an outstanding product update while the outstanding product updates is reviewed and distributed. During the delay, the products persist in an unpatched condition. Similarly, because the products at the endpoints are not known, a user of an endpoint may operate unauthorized products, which may persist in a vulnerable or unpatched state.

Some embodiments of the present disclosure improve conventional patch management systems and address the inefficiencies and technical issues described above. For instance, some embodiments of the cloud network 126 manage the products 115 and the endpoints 106 based on defined states. The defined states are then automatically maintained based on detection of trigger events. Thus, these and other embodiments reduces the management of the products 115 and endpoints 106 to definition or generation of defined states. The ongoing patch and update management in conventional systems changes to a state definition process that is actively and/or continuously maintained.

Additionally, some embodiments implement scan processes that may be initiated responsive to the trigger events. Thus, detection of the trigger event and correction of the issue in a first managed endpoint (106) may result in a scan of some or all of the cloud network 126 for similar issues.

Moreover, embodiments of the present disclosure are directed to a computer-centric problem and are implemented in a computer-centric environment. For instance, the embodiments of the present disclosure are directed to product update management in the managed network 110 and the cloud network 126. Computing processes occurring in the operating environment 100 include communication and implementation of product updates that include software patches and code changes on products 115 loaded on the endpoints 106 as well as product installation or removal commands that modify a product inventory at the endpoints 106. Communications during the processes described in this present disclosure involve the communication of data in electronic and optical forms via a network 121 and also involve the electrical and optical interpretation of the data and information.

Furthermore, the embodiments of the present disclosure address a technical issue that exists in a technical environment. The technical issue includes an inability of conventional patch management systems to manage product updates based on defined states at the endpoints 106 and the inefficiencies that result therefrom. The technical problem is solved through a technical solution. For instance, the technical solution involves generation of defined states and corresponding trigger events in the cloud network 126 and at the endpoints 106. Automatic product modification processes are then implemented to maintain the defined state(s) in the cloud network 126.

The operating environment 100 may include the cloud network 126, the administrators 108, the managed networks 110, a third-party server 104, a support device 113, and a distribution server 112. The managed networks 110 each includes the management devices 102 and may communicate with the third-party server 104, the support device 113, the endpoints 106, and the distribution server 112 via the network 121. The components of the operating environment 100 are configured to communicate data and information via the network 121 to perform automated endpoint product management as described in the present disclosure. Each of these components are described below.

The network 121 may include any communication network configured for communication of signals between the components (e.g., 102, 113, 108, 112, 104, 106, 122, and 124) of the operating environment 100. The network 121 may be wired or wireless. The network 121 may have configurations including a star configuration, a token ring configuration, or another suitable configuration. Furthermore, the network 121 may include a local area network (LAN), a wide area network (WAN) (e.g., the Internet), and/or other interconnected data paths across which multiple devices may communicate. In some embodiments, the network 121 may include a peer-to-peer network. The network 121 may also be coupled to or include portions of a telecommunications network that may enable communication of data in a variety of different communication protocols.

In some embodiments, the network 121 includes or is configured to include a BLUETOOTH® communication network, a Z-Wave® communication network, an Insteon® communication network, an EnOcean® communication network, a Wi-Fi communication network, a ZigBee communication network, a representative state transfer application protocol interface (REST API) communication network, an extensible messaging and presence protocol (XMPP) communication network, a cellular communications network, any similar communication networks, or any combination thereof for sending and receiving data. The data communicated in the network 121 may include data communicated via short messaging service (SMS), multimedia messaging service (MMS), hypertext transfer protocol (HTTP), direct data connection, wireless application protocol (WAP), or any other protocol that may be implemented in the components of the operating environment 100.

The third-party server 104 includes a hardware-based computer device or collection thereof that is configured to communicate with the other components of the operating environment 100 via the network 121. The third-party server 104 is configured to provide access to one or more update lists 117, portions thereof, and information pertaining to entries of the update lists 117. For instance, the third-party server 104 may host a website on which the update lists 117 are available. The third-party server 104 may host or store the update lists 117 such that information, metadata, and data related to entries on the update lists 117 may be accessed via the network 121. For instance, the management device 102 or the support device 113 may be configured to access the update lists 117 or information related to entries on the update lists 117 via the network 121. In some embodiments, the management device 102 or the support device 113 may be configured to communicate an electronic message to the third-party server 104 that accesses the update lists 117, information (e.g., update metadata) related to entries on the update lists 117, or a specific portion of the update lists 117. Some examples of example application programming interfaces (APIs) for accessing the update lists 117 are available at https://www.circl.lu/services/cve-search/.

The update lists 117 may include a list of entries. The entries relate to a cybersecurity threat, a cybersecurity vulnerability, a software application code change, a patch, a hardware interface modification, or another update to a product. The entries have information related to the entries. For instance, one or more of the entries may include an identification number, an entry date, an entry summary, a links to product updates (e.g., a code change or patch), a threat severity, or some combination thereof.

An example of the third-party server 104 may be Department of Homeland Security (DHS) server(s). In this example, the update lists 117 may include lists of common vulnerabilities and exposures (CVEs) hosted by the DHS servers. Another example of the third-party server 104 may be National Institute of Standards and Technology (NIST) servers. In this example, the update lists 117 may include a national vulnerability database that is hosted by the NIST servers. The NIST server may host the information assurance vulnerability alerts (IAVAs), which may an example of the update lists 117. One with skill in the art may be familiar with other suitable examples of the third-party server 104 and the update lists 117. Lists of vulnerabilities and threats are maintained by some additional entities such as MITRE.

The depicted embodiment of the operating environment 100 includes the support device 113. The support device 113 may be a hardware-based computer device configured to communicate data and information with the other components of the operating environment 100 via the network 121. In embodiments that include the support device 113, the update lists 117 may be consumed at the support device to generate an update catalog 111. The update catalog 111 includes records and information related to previous product updates. As the update lists 117 become available, update metadata or other information maybe appended to the update catalog 111.

The support device 113 may communicate the update catalog 111 to the management devices 102, the cloud server 122, or may otherwise make available the update catalog 111. For instance, the support device 113 may also communicate the update catalog 111 to a separate host that is connected to the network 121. The update catalog 111 may be accessed from the separate host and stored on a suitable storage medium such as the cloud storage 124. The management devices 102 or the cloud server 122 may then access the update catalog 111 from the storage medium.

The update catalog 111 may be stored at least temporarily at the management devices 102 or the cloud server 122. In other instances, the update catalog 111 may be stored remotely and accessed by the management devices 102 or the cloud server 122 via the network 121. In FIG. 1, the update catalog 111 is depicted as being communicated via the network 121. In some embodiments, the update catalog 111 may be communicated or accessed outside the network 121.

In some embodiments, the operating environment 100 may not include the support device 113. In these embodiments, the management devices 102 or the cloud server 122 might directly consume information of the update lists 117. The information consumed from the update lists 117 may be appended onto the update catalog 111 by the management devices 102 or the cloud server 122.

The depicted embodiment of the operating environment 100 includes the distribution server 112. The distribution server 112 may be a hardware-based server configured to communicate data and information with the other components of the operating environment 100 via the network 121. The distribution server 112 may be configured to store published product updates or instructions related to published product updates. For example, in some embodiments, the management devices 102 or the cloud server 122 may communicate one or more product updates or communications related to a modification process to the distribution server 112. The endpoints 106 may then access the product updates or the communications at the distribution server 112. After the product updates or communications are accessed, the product updates or communications may be implemented at the endpoints 106 to modify code of one of the products 115. An example of the distribution server 112 may include a Windows® Server Update Services (WSUS) server.

In the depicted embodiment, the distribution server 112 is not included in the managed networks 110. In some embodiments, the distribution server 112 may be included in the managed networks 110. For instance, in some embodiments in which the distribution server 112 includes the WSUS server, it may be included in the managed networks 110. In some embodiments, the operating environment 100 may omit the distribution server 112. Additionally or alternatively, the distribution server 112 may be used for a portion of product updates and not used for another portion of the product updates.

The cloud storage 124 includes a device that is configured to receive information and data communicated in the cloud network 126. The cloud storage 124 may be or include memory 512 or data storage 504 described with reference to FIG. 5. The cloud storage 124 stores the information and data such that it is accessible by the cloud server 122 and the management devices 102. For instance, the update catalog 111 may be stored in the cloud storage 124. The management devices 102 may then access the update catalog 111 via the network 121. In some embodiment, the defined state(s), the trigger events, historical information related to the defined states and the trigger events, or combinations thereof might be stored in the cloud storage 124.

Additionally, information related to the components of the operating environment 100 (e.g., the managed networks 110, the endpoints 106, the products 115, etc.) may be stored in the cloud storage 124. The information related to the components may enable comparisons between the components to determine which components may be subject to the same defined state, the same trigger events, the same modification processes, etc.

The cloud server 122 includes a hardware-based computer device or collection thereof that is configured to communicate with the other components of the operating environment 100 via the network 121. The cloud server 122 may be remote to the managed networks 110 and may interoperate with the managed networks 110 via the network 121. The cloud server 122 may be operated by a first entity, the first managed network 110 may be operated by a second entity, and the second managed network 110 may be operated by a third entity. The first entity may provide the endpoint management services to the managed networks 110. In some embodiments, the cloud server 122 may include multiple devices at least a portion of which may include an edge device that performs some or all of the endpoint management operations described in the present disclosure. The cloud server 122 may include cloud update module 120, which is described below.

Each of the managed networks 110 include one of the management devices 102 and a set of the endpoints 106. The managed networks 110 are implemented to enable management of the endpoints 106 by the management device 102 and the cloud server 122. To implement the managed network 110, the endpoints 106 may be enrolled. After the endpoints 106 are enrolled, ongoing management of the endpoints 106 may be implemented by the management device 102 and the cloud server 122. The ongoing management may include overseeing and dictating at least a part of the operations at the endpoints 106 as well as dictate or control product updates and product installation and use at the endpoints 106 as described in the present disclosure.

Management of the product updates may include determining which product updates pertain to the products 115, to determine which of the product updates to distribute to the endpoints 106, and to distribute the product updates to the endpoints 106 such that the product updates may be locally implemented. Implementation of the product updates at the endpoints 106 include modification to computer code, programming code, or computer-executable instructions of a program that comprise the products 115.

Management of the product installation and use at the endpoints 106 may include determining whether a particular product or particular set of products is installed on or a removed from the endpoint 106. Additionally, the particular product or the particular set of products may be installed at or removed from the endpoints 106.

The endpoints 106 may include hardware-based computer systems that are configured to communicate with the other components of the operating environment 100 via the network 121. The endpoints 106 may include any computer device that may be managed by the management device 102 and/or have been enrolled in the managed network 110. Generally, the endpoints 106 include devices that are operated by the personnel and systems of an enterprise or store data of the enterprise. The endpoints 106 might include workstations of an enterprise, servers, data storage systems, printers, telephones, internet of things (IOT) devices, smart watches, sensors, automobiles, battery charging devices, scanner devices, etc. The endpoints 106 may also include virtual machines, which may include a portion of a single processing unit or one or more portions of multiple processing units, which may be included in multiple machines. The endpoints 106 may be referred to as managed endpoints when the endpoints 106 are included in the managed networks 110.

One or more of the endpoints 106 include the products 115, the agent 123, and the kernel driver 119. The kernel driver 119 is configured to report installation and removal of the products 115. For instance, a user of the endpoint 106 might install a particular product without authorization of the administrator 108. The kernel driver 119 may report the installation to the cloud server 122 or the management device 102.

The products 115 may include applications of any kind or type. Some examples of the products 115 may include software applications, enterprise software, operating systems, and the like. The products 115 on the endpoints 106 in the first managed network 110A may not be the same as the product 115 on the endpoints 106 in the second managed network 110B. Additionally, the products 115 may vary between the endpoints 106 on each of the managed networks 110.

In some embodiments, one or both of the managed endpoints may include the agent 123. The agent 123 may be locally installed at least temporarily on the endpoints 106. For instance, the agent 123 may be installed on the endpoints 106 when the endpoints 106 are enrolled in one of the managed networks 110 or when a particular service is loaded at the endpoints 106. The agent 123 may have access to information related to the products 115 or operations of the endpoints 106 and may be configured to communicate the information such as product metadata related to the products 115 to the management device 102. The information related to the products 115 may include a current inventory of the products 115 as well as information or product metadata related to the products 115 such as version, vendor, type, hardware integrations, size, privacy policy, software interfaces, and the like. The agents 123 may also implement administrative and/or management processes within the managed network 110. The agent 123 may be configured to enforce the defined states as well as collect information related to the products 115. Additionally, in some embodiments, the agents 123 may be configured to maintain enforcement when connections to the management device 102 or the cloud server 122 is lost.

The management devices 102 may each include a hardware-based computer system that is configured to communicate with the other components of the operating environment 100 via the network 121. The management device 102 may be associated with one of the administrators 108. The administrators 108 may be an individual, a set of individuals, or a system that interfaces with the management devices 102. In some embodiments, the administrator 108 may provide input to the management device 102. The input provided by the administrator 108 may form the basis of some computing processes performed by the management device 102. For example, the administrator 108 may provide user input at a user interface associated with the management device 102. The user input may be used to generate defined states and may take the form of a selection of an icon or a button on the management devices 102.

The management devices 102 may include an update module 116A or 116B (generally, update module 116 or update modules 116). The update modules 116 and the cloud update module 120 (collectively, update modules 116/120) may be configured for automated endpoint management of the endpoints 106 of the managed networks 110. For example, the update modules 116/120 may be configured to perform product management based on the defined states and trigger event detection. In these and other embodiments, the trigger events may include a circumstance in the managed networks 110 or the cloud network 126 that indicates an inconsistency with the defined state. The update modules 116/120 may automatically implement of a product modification process, responsive to detection of the trigger events. The product modification process is configured to at least partially restore the endpoint 106 or a set of the endpoints 106 to the defined state.

Additionally, the update modules 116/120 may be configured to perform vulnerability detection and mitigation processes in the managed networks 110. For instance, the update modules 116/120 may receive one or more defined states or data indicative of the defined states. The defined states may be associated with one or more of the products 115 installed at the endpoints 106. The defined states may include one or more characteristics, constraints, or conditions of the products 115 such as a product update status, whether a storage device (e.g., portable and/or removable storage devices) is attached, changes to specific storage locations (e.g., additions/deletions/modification to specific Windows® hive locations, package databases on Linux®, etc.), a product being removed or not present on the endpoint 106, a product version preference, a preferred product being installed at the managed endpoint, a vendor update installation status, other conditions of the products 115 or endpoints 106 or some combination thereof.

The update modules 116/120 detect a trigger event that is related to the defined states. The trigger event may be detected on one or more of the components of the cloud network 126 or the operating environment 100 or communications therebetween. The trigger event is indicative of a change to the endpoints 106 or to the products 115 that is inconsistent with the defined state. For instance, detection of the trigger event may include monitoring a software management interface that documents product inventory of the managed networks 110. Additionally or alternatively, the detecting the trigger event may include communication (direct or indirect) with the kernel driver 119 or the agent 123 installed at the endpoint 106.

The update modules 116/120 may automatically implement a product modification process. The product modification process may include distribution of at least one product update to one of more of the products 115. The product update may include a patch, version update, vulnerability fix, and the like. Additionally or alternatively, the product modification process may be configured to remove an installed product, replace an installed product, change to a setting or feature on an installed product, etc.

Additionally, in some embodiments the update modules 116/120 may include one or more scan operations. For instance, the update modules 116/120 may initiate a local scan of one of the endpoints 106, a network scan of additional endpoints 106 of one of the managed networks 110, a global scan of additional managed networks 110 hosted on the cloud network 126, or combinations thereof. The scans may be performed to identify outstanding patches and vulnerabilities or other inconsistencies with the defined state. Based on the scan(s) the update modules 116/120 may implement product modifications on one or more additional endpoints 106 responsive to identification of the trigger event or corresponding inconsistencies with the defined state.

The kernel driver 119, the update modules 116/120, the agent 123, the products 115, and components thereof may be implemented using hardware including a processor, a microprocessor (e.g., to perform or control performance of one or more operations), a field-programmable gate array (FPGA), or an application-specific integrated circuit (ASIC). In some other instances, the kernel driver 119, the agent 123, the update modules 116/120, the products 115, and components thereof may be implemented using a combination of hardware and software. Implementation in software may include rapid activation and deactivation of one or more transistors or transistor elements such as may be included in hardware of a computing system (e.g., the endpoints 106, the cloud server 122, or the management devices 102 of FIG. 1). Additionally, software defined instructions may operate on information within transistor elements. Implementation of software instructions may at least temporarily reconfigure electronic pathways and transform computing hardware.

One or both of the managed networks 110 may be associated with an enterprise, a portion of an enterprise, a government entity, or another entity or set of devices (102, 113, 106, or 112). In some embodiments, the management devices 102 and/or the cloud server 122 may be a single server, a set of servers, a virtual device, or a virtual server in the cloud network 126 or another remote server network. In these and other embodiments, the update modules 116/120 may be spread over two or more cores, which may be virtualized across multiple physical machines.

Modifications, additions, or omissions may be made to the operating environment 100 without departing from the scope of the present disclosure. For example, the operating environment 100 may include two or more managed networks 110, two or more management devices 102, one or more support devices 113, two or more endpoints 106, one or more third-party servers 104, one or more distribution servers 112, two more cloud servers 122, two or more cloud storages 124, or any combination thereof. Moreover, the separation of various components and devices in the embodiments described herein is not meant to indicate that the separation occurs in all embodiments. Moreover, it may be understood with the benefit of this disclosure that the described components and servers may generally be integrated together in a single component or server or separated into multiple components or servers.

Figure 2:
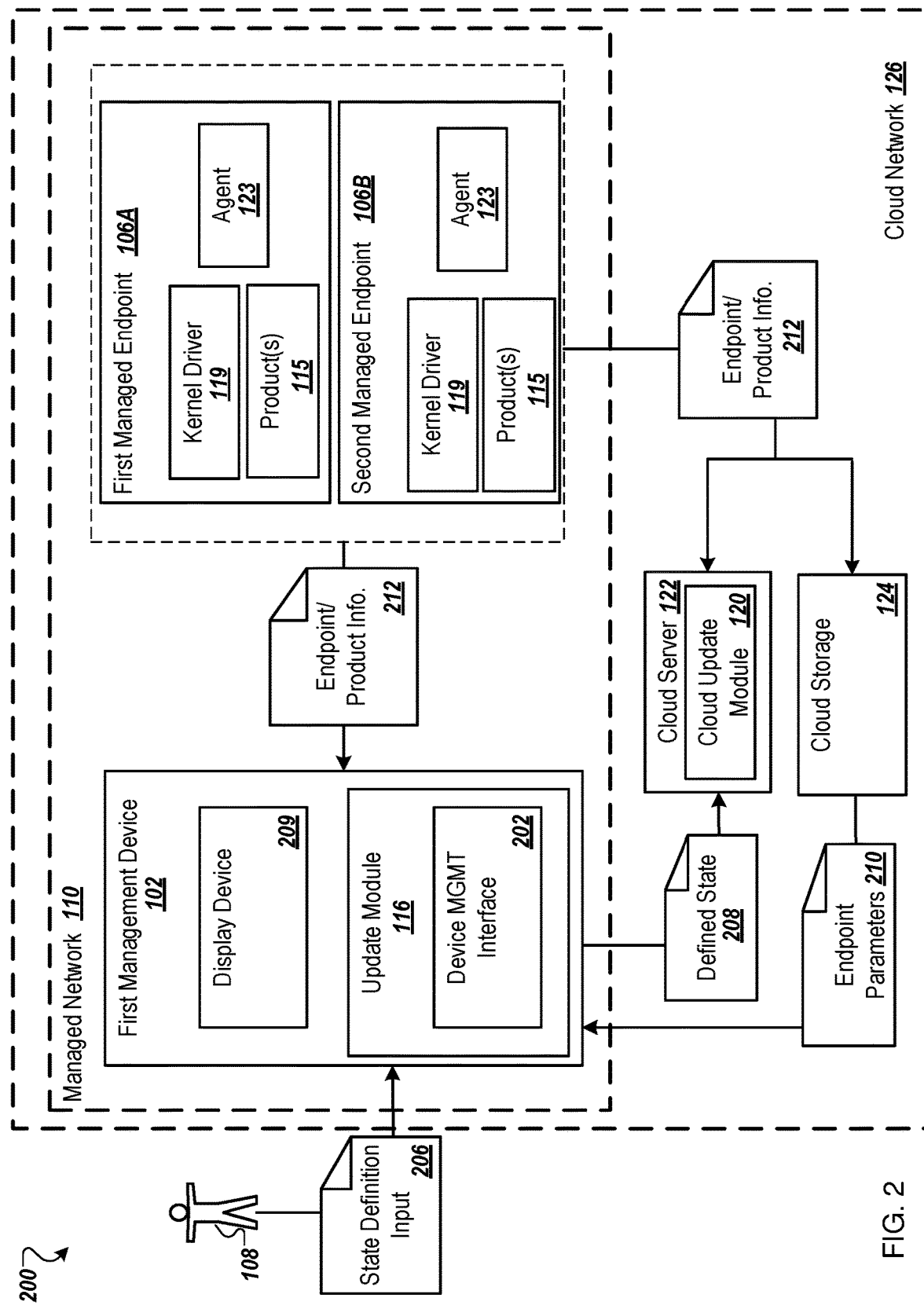
FIG. 2 depicts a block diagram of an example state definition process that may be implemented in the operating environment of FIG. 1.

FIG. 2 depicts a block diagram of an example state definition process (definition process) 200 that may be implemented in the operating environment 100 of FIG. 1 or another suitable environment. The definition process 200 includes sub-processes performed by components (e.g., 102, 104, 106, 108, 122, 123, 124, etc.) described with reference to FIG. 1. Although not depicted in FIG. 2, communication of data and information may be via a network such as the network 121 of FIG. 1.

In the embodiment of FIG. 2, the administrator 108 may implement the definition process 200. The definition process 200 may be implemented to establish or set a state in which the endpoints 106 are maintained by the update modules 116/120. The state may include a specific set of parameters, conditions, or characteristics of the endpoints 106, the managed network 110, one or more of the products 115, a network condition, or some combination thereon. After the state is defined, it may be maintained through one or more automated processes described in the present disclosure. Accordingly, conventional product management and patch management may be reduced to state definition using embodiments described in the present disclosure.

The definition process 200 may be performed at least partially by a device management interface 202 (in FIG. 2, "device MGMT interface"), which may be included in the update module 116. The device management interface 202 may be configured to interface with a display device 209. For example, the device management interface 202 may pull or otherwise access endpoint parameters 210 from the cloud storage 124, endpoint and product information 212 from the cloud storage 124 or manage endpoints 106, or other parameters and information from another suitable data repository. The endpoint parameters 210 and the endpoint and product information 212 may be displayed to the administrator 108. Based on the endpoint parameters 210 and the endpoint and product information 212, the administrator 108 may provide state definition input 206 to the first management device 102. The state definition input 206 may select particular parameters of the endpoint parameters 210 and the endpoint and product information 212 and/or conditions related thereto to generate a defined state 208.

In some embodiments, the endpoint and product information 212 may be communicated directly or indirectly by the kernel driver 119 and/or the agent 123. In these and other embodiments, the endpoint and product information 212 may be updated periodically to reflect a current state of the products 115. The kernel driver 119 or the agent 123 may then communicate the endpoint and product information 212 to the management device 102 or the cloud server 122.

The defined state 208 may include constraints on conditions of one or more components of the managed network 110. The defined state 208 may be related to one or more of the endpoints 106, one or more of the products 115, one or more of the managed networks 110, or some combination thereof. The defined state 208 outlines constraints that are maintained by the update modules 116/120.

For instance, the first endpoint 106A may include a first product included in the products 115. The defined state 208 may include a constraint that the first product is to be maintained in an up-to-date status (e.g., executing a latest version). Accordingly, any indication that the first product is not in the up-to-date status is a trigger event that may initiate a product update modification process. As another example, the defined state 208 may include a constraint that the first product is not allowed to be installed on the first endpoint 106A. Accordingly, any indication that the first product is installed on the first endpoint 106A is a trigger event that may initiate removal of the first product.

The defined state 208 may include multiple other constraints and conditions. For instance, the other constraints and conditions may include a product update status of one or more of the products 115, a product version preference of one or more of the products 115 (e.g., the one or more products being up to date), a preferred product being installed at the endpoint 106, a vendor update installation status, a product being removed or not present on the endpoint 106, a security setting being implemented at the endpoint 106 prior to installation of the product 115, a time limitation of use of the product 115, a location limitation of use of the product 115, a specific combination of the products 115 at the endpoint 106, an indication of a vulnerability of a product 115 (or lack thereof), a known weakness of the product 115, a threat or attack in another component or product 115, another suitable constraint or condition, or combinations thereof.

The defined state 208 may be communicated to the cloud server 122 or may be stored in the first management device 102. The defined state 208 can then be used to as a basis of the trigger event, which indicates an inconsistency with the defined state 208.

In the embodiment of FIG. 2, the administrator 108 interacts with the first management device 102 to generate the defined state 208. In some embodiments, the administrator 108 may interact with the cloud update module 120 or another suitable system to define states. Additionally or alternatively, the defined state 208 may be previously defined and communicated or otherwise applied in one or more of the managed networks 110.

Additionally, in the embodiment of FIG. 2, the administrator 108 generates a single defined state 208. In other embodiments, multiple defined states 208 might be generated for the managed network 110. The multiple defined states 208 may be stored or processed by the update modules 116/120. The multiple defined states 208 may form the bases of multiple trigger events.

Figure 3:
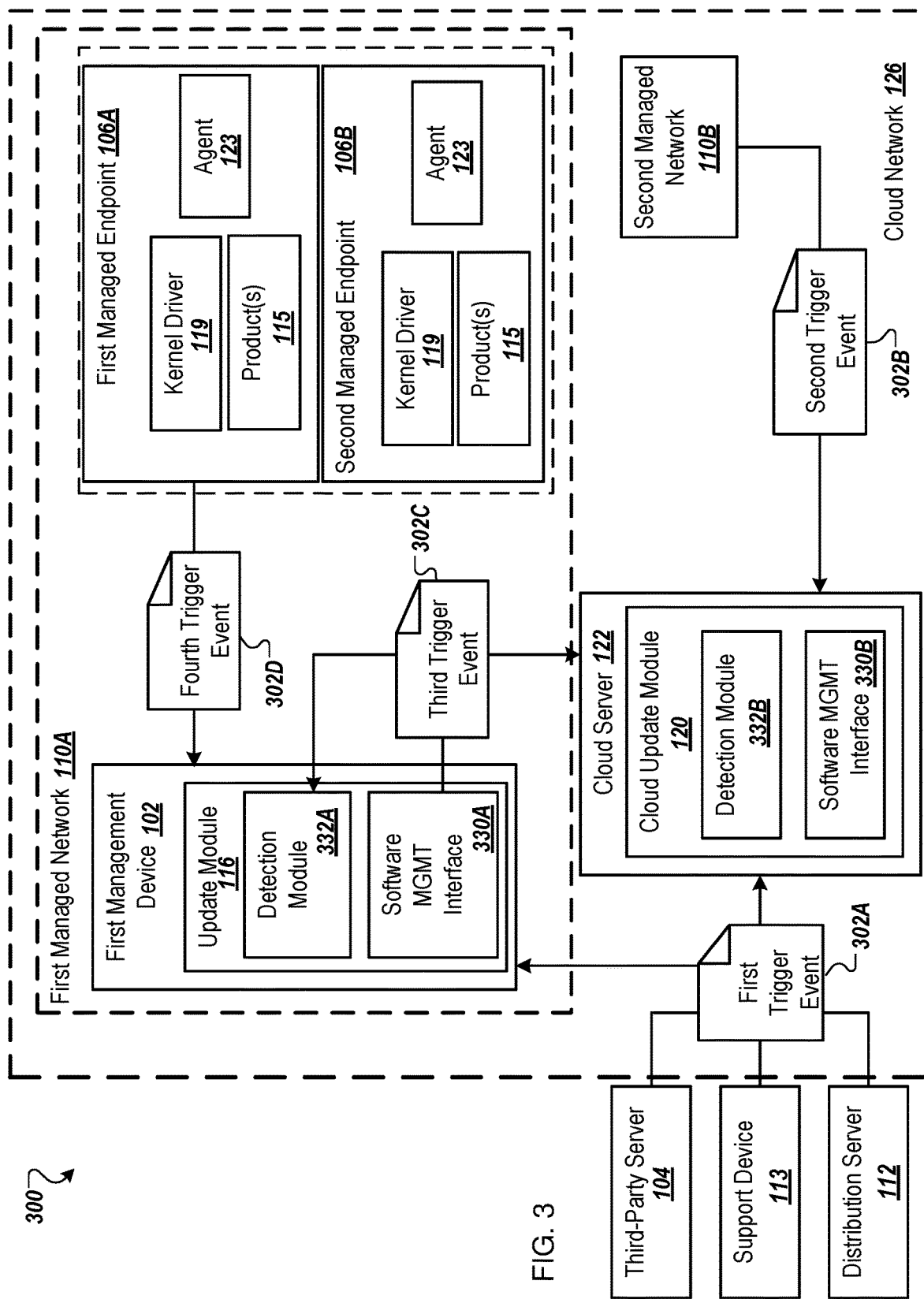
FIG. 3 depicts a block diagram of an example trigger event detection process that may be implemented in the operating environment of FIG. 1.

FIG. 3 depicts a block diagram of an example trigger event detection process (detection process) 300 that may be implemented in the operating environment 100 of FIG. 1 or another suitable environment. The detection process 300 includes sub-processes or steps that may be performed by components (e.g., 102, 122, 123, 106, 104, etc.) introduced with reference to FIGS. 1 and 2. Although not depicted in FIG. 3, communication of data and information may be via a network such as the network 121.

The detection process 300 may be implemented with the definition process 200 of FIG. 2 and/or a product modification process such as the product modification process 400 described below. For instance, the definition process 200 may be completed (e.g., the defined state 208 may be generated and received by the first management device 102 and/or the cloud server 122). After the definition process 200, the detection process 300 may be performed by the update module 116 and the cloud update module 120 on a continuous basis to monitor for trigger events 302A-302D (generally, trigger event 302 or trigger events 302) that are based on the defined state 208. Alternatively, the definition process 200 may be performed on a periodic basis (e.g., according to a schedule), manually initiated (e.g., by the administrator 108), etc.

In some embodiments, the detection process 300 may be an ongoing process, which may be performed as a background process that is not visible to the administrator (e.g., 108 of FIG. 1). Accordingly, the administrator (e.g., 108) may not have to initiate or review the detection process 300. Additionally, in some embodiments, the detection process 300 may be integrated into or combined with another process such as a product management process, a product modification process, a vulnerability detection and mitigation process or another suitable endpoint management process.

The detection process 300 of FIG. 3 illustrates various ways the trigger events 302 are detected. Additionally, the detection process 300 illustrates multiple sources of the trigger events 302. As introduced elsewhere in the present disclosure, the trigger event 302 may include any circumstance in the cloud network 126 that indicates an inconsistency with one or more of the defined states (e.g., the defined states 208) of the products 115, the endpoints 106, the managed networks 110, the cloud server 122, or combinations thereof.

Generally, the detection process 300 may be configured to be implemented throughout the cloud network 126. The detection process 300 may monitor communication of information between the second managed network 110B, the cloud server 122, the third-party server 104, the support device 113, the distribution server 112, the management device 102, the endpoints 106, or any combinations thereof. For instance, the detection process 300 may monitor communications between the second managed network 110B and the first managed network 110A, between the cloud server 122 and the endpoints 106, between the first management device 102 and the endpoint 106, etc. A subset of these embodiments of the detection process is described below.

In the embodiment of FIG. 3, the update modules 116/120 may include a detection module 332A or 332B (generally, the detection module 332). The detection module 332 may be configured to generate the trigger events 302 that correspond to the defined states. As used in the present disclosure, correspondence between one or more of the trigger events 302 and one or more of the defined states means that the trigger event 302 is an incident, an event, or a circumstance that indicates an inconsistency with the defined state. Some examples are provided throughout the present disclosure. In other embodiments another system or module may generate the trigger events 302. Additionally or alternatively, an administrator may define or modify the trigger events 302 in some embodiments.

The detection module 332 may be configured to interface with portions of the cloud network 126, a communication network (e.g., 120), or first management device 102 to detect the trigger events 302. Detection of the trigger events 302 might include discovery or recognition of data communicated to or from the cloud network 126, a change to one or more of the endpoints 106, a change to one or more of the products 115, changes to data stored in the cloud storage 124, changes to defined states, or combinations thereof.

In some embodiments, a first trigger event 302A may include a communication from one or more of the third-party server 104, the support device 113, or the distribution server 112. The communication of the first trigger event 302A indicates that there is a change outside the cloud network 126 that may result in or cause an inconsistency with the defined states. For instance, the first trigger event 302A may include an update to content of an update catalog (e.g., 111 of FIG. 1), an update to one of the products 115 (e.g., by a product vendor), a change to an update catalog, a notification of a change to an update list (e.g., 117 of FIG. 1), a notification by a service in the cloud network 126 that is pushed to the endpoints 106, a notification of a distribution of a patch or vulnerability, and the like. In this example, the defined state may include maintaining the associated product in a patched state. A corresponding trigger event (the first trigger event 302A) may be detection of the communications from the third-party server 104, the support device 113, or the distribution server 112.

Responsive to the first trigger event 302A, the update modules 116/120 may implement a product modification process. For instance, the update module 116 may communicate a patch related to the change to the update catalog to an associated product. Additionally, the first trigger event 302A may initiate a scan process of one or more other components of the cloud network 126 such as other endpoints 106, the second managed network 110B, etc. to determine whether the first trigger event 302A may be relevant to the other components. Additionally, the update modules 116/120 may implement a product modification processes in the other components as necessary.

In some embodiments, a second trigger event 302B may include a communication or notification from the second managed network 110B. The communication of the second managed network 110B may indicate that there is product modification process or a trigger event detection in the second managed network 110B. For instance, the first managed network 110A may be similar to the second managed network 110B. Thus, the detection module 332 may be configured to monitor the second managed network 110B for trigger events or product modification processes that might also be relevant in the first managed network 110A. Responsive to the second trigger event 302B, the update modules 116/120 may implement a product modification process. For instance, the product modification process implemented in the second managed network 110B may also be implemented in the first managed network 110A. Accordingly, once an issue is detected in one of the managed networks 110, the cloud server 122 may correct the issue throughout the cloud network 126.

In some embodiments, a third trigger event 302C may include a communication from a software management interface 330A or 330B (generally, software management interface 330). The software management interface 330 may be configured to record software inventory of the managed network 110 or the components of the cloud network 126. Changes to the software inventory may be included in the third trigger event 302C and communicated to the detection module 332. Any change to the software inventory that is inconsistent with the defined states may result in implementation of the product modification process.

In some embodiments, a fourth trigger event 302D may include a communication from one or more of the endpoints 106. The communication of the fourth trigger event 302D indicates that there is a change to the products 115 of the endpoint 106. For instance, the change to the products 115 may include an unauthorized change to a software inventory of the endpoint 106. The fourth trigger event 302D may originate at the kernel driver 119 or the agent 123 at the endpoint 106.

In some embodiments, the fourth trigger event 302D may be communicated directly or indirectly by the kernel driver 119 and/or the agent 123. In these and other embodiments, the fourth trigger event 302D may be based on changes to the products 115, which may be updated periodically as described elsewhere in the current disclosure. In the embodiment of FIG. 3, the fourth trigger event 302D is communicated to the first management device 102. In other embodiments, the fourth trigger event 302D may additionally or alternatively communicated to the cloud server 122.

Responsive to the fourth trigger event 302D, the update modules 116/120 may implement a product modification process. For instance, the update module 116 may communicate an instruction or a command to remove one of the products 115 that is associated with the unauthorized change. In this example, the defined state may include maintaining a particular inventory at the endpoints 106. A corresponding trigger event (the fourth trigger event 302D) may be detection of the communications from the endpoints 106 regarding the inventory of products 115.

Additionally, in these and other embodiments, the fourth trigger event 302D may be an example of the second trigger event 302B. For example, the fourth trigger event 302D in the first managed network 110A may trigger a product modification process in the second managed network 110B. For instance, the endpoints 106 of the first managed network 110A may be similar to the endpoints in the second managed network 110B. Accordingly, an inventory change to the first managed network 110A may increase a likelihood of a similar inventory change in the second managed network 110B.

Figure 4:
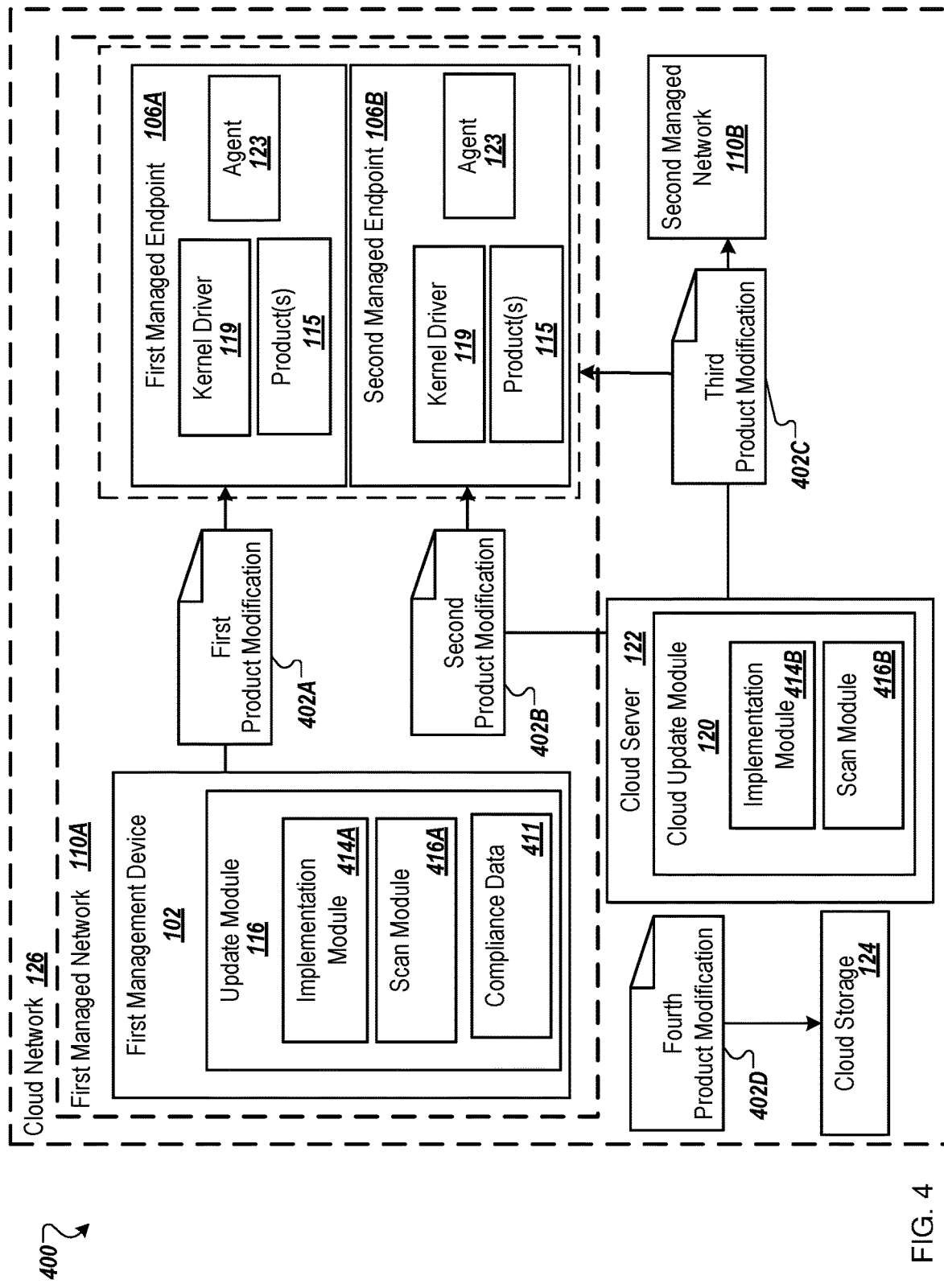
FIG. 4 depicts a block diagram of an example product modification process that may be implemented in the operating environment of FIG. 1.

FIG. 4 depicts a block diagram of an example product modification process (modification process) 400 that may be implemented in the operating environment 100 of FIG. 1 or another suitable environment. The modification process 400 includes one or more sub-processes performed by components (e.g., 102, 124, 122, 123, 110, 106, etc.) introduced with respect to FIGS. 1-3. Although not depicted in FIG. 4, communication of data and information may be via a network such as the network 121.

The modification process 400 may be implemented with the detection process 300 and/or the definition process 200 described elsewhere in the present disclosure. Alternatively, the modification process 400 may be implemented independently or with one or more other suitable endpoint management processes.

In some embodiments, the modification process 400 may be an ongoing process, which may be performed as a background process that is not visible to the administrator (e.g., 108 of FIG. 1). Accordingly, the administrator (e.g., 108) may not have to initiate or review the modification process 400.

The modification process 400 may be implemented to make a change to one or both of the endpoints 106 as well as managed endpoints in the second managed network 110B.

The modification process 400 may change a state of the endpoints 106 or a component of the second managed network 110B, which may result in a different configuration and/or function resulting from the modification process 400. For instance, prior to the modification process 400, the endpoints 106 may perform a first set of operations responsive to a stimulus or circumstance. Following the modification process 400, the endpoints 106 may perform a second set of operations that are different from the first set of operations responsive to the stimulus or circumstance. Thus, the modification process 400 performs an operation that changes the state and operation of the endpoints 106 that may be remote from the first managed device 102 and/or the cloud server 122.

The modification process 400 may be automatically implemented. For instance, in some embodiments, the modification process 400 may be performed without input from an administrator that is configured to initiate or control the modification process 400. In these and other embodiments, the modification process 400 may be implemented automatically in response to detection of a trigger event such as the trigger events 302 described with reference to FIG. 3. Accordingly, in these embodiments, one or both of the first management device 102 and the cloud server 122 may implement the modification process 400 immediately following or after receipt of data indicative of the trigger event. Accordingly, the cloud server 122 and/or the first management device 102 may operate without administrative oversight after state definitions (e.g., the defined state 208) are generated.

In some embodiments, the modification process 400 may include one or more scan processes such as a local scan of one or more of the products 115 on the endpoint 106, a network scan of two or more endpoints 106 of a managed network 110, a global scan of two or more managed networks 110 hosted on the cloud network 126, or some combination thereof. For instance, the update modules 116/120 may include scan module 416A or 416B, respectively (generally, scan module 416). The scan module 416 may be configured to perform a scan of some or all of the operating environment 100. The scan may be implemented to identify presence of a trigger event in portions of the operating environment 100.

In some embodiments, the scan module 416 may perform a network scan. The network scan might be directed to managed endpoints 106 of one managed network 110. For instance, a first trigger event may indicate an issue with the first endpoint 106A. The scan module 416 may be configured to scan the second endpoint 106B of the first managed network 110A. The scan may be implemented to identify the presence of the trigger event in the second endpoint 106B. Additionally, the scan module 416 may scan some or all of the other endpoints in of the first managed network 110A to identify the presence of the trigger event throughout the first managed network 110A.

In some embodiments, the scan module 416 may perform a local scan. The local scan might be directed to the products 115 of the first endpoint 106. For instance, a first trigger event may indicate an issue with a first product of the products 115. The scan modules 416 may scan the other products 115 on the first endpoint 106A to identify other issues on the first endpoint 106A. For instance, the local scan may be implemented to identify outstanding patches and vulnerabilities at the first endpoint 106A.

Additionally or alternatively, the scan module 416 may be configured to perform a global scan of two or more managed networks 110 on the operating environment 100. The global scan may include determining whether the trigger event is present on one or more managed endpoints on the second managed network 110B. The second managed network 110B may be unrelated (e.g., associated with a different enterprise) to the first managed network 110A. Accordingly, the global scan may ensure compliance with defined states throughout the operating environment 100.

In some embodiments the scan may include review of information in the cloud storage 124 such as endpoint information, network information, etc. Additionally or alternatively, the scan may include review of information communicated from the kernel driver 119, the agent 123 on the endpoints 106, etc. For instance, the scan may include accessing information from the agent 123 or the kernel driver 119 on the endpoints 106 and processing the information. The scan may identify endpoints with similar defined states, devices with similar device characteristics, networks with similar network characteristics, and the like.

The scan module 416 may be configured to initiate the scan based on receipt or detection of the trigger event. For instance, the scan may be initiated without input from an administrator. In embodiments including the scan modules 416, the scan module 416 may return a list the endpoints 106 with issues related to the trigger event. Additionally or alternatively, the scan module 416 may be configured to communicate a signal to an implementation module 414A or 414B (generally, implementation module 414). Based on the signal, the implementation module 414 may perform remaining portions of the modification process 400 described below.

Additionally, in some embodiments, the scan module 416 may be configured to initiate the scan based on a pattern of trigger events. For instance, the trigger event may include a particular action that has occurred in two or more similar endpoints 106 such as installation of an unauthorized product in five similar endpoints 106. The scan module 416 may perform a scan to identify other endpoints 106 that are consistent with the pattern and preempt the trigger event. For instance, the scan module 416 may initiate a global scan for similar endpoints 106 to those endpoints that installed the unauthorized product. The similarity may include a role of a user, an inventory of current products, relationships between users, similarity of the enterprise utilizing the endpoints 106 etc. Responsive to similar endpoints 106 being identified, the modification process 400 performed by the implementation modules 414 may include a command that prevents or blacklists the unauthorized product, a notification that communicates with the user, etc. In some embodiments, a machine learning or an artificial intelligence process may be implemented to receive the trigger events, analyze the trigger events for patterns, and formulate preemptive modification processes based thereon.

In some embodiments, the update modules 116/120 may omit the scan module 416. In these and other embodiments, the trigger events may not initiate a scan of other endpoints or networks. Instead, the implementation modules 414 may communicate product modifications 402A-402D (generally, product modification 402 or product modifications 402) may implement the modification process 400 without a scan process and responsive directly to the trigger events.

The modification process 400 performed by the implementation modules 414 may include distribution of data and information to the endpoints 106, the second managed network 110B, the cloud storage 124, or some combination thereof. The data and information communicated in the modification process 400 are represented in FIG. 4 by the product modifications 402. An embodiment of the modification process 400 may include communication of a subset of the product modifications 402. For instance, a first embodiment of the modification process 400 might include communication of a first product modification 402A and a second product modification 402B, while a second embodiment of the modification process 400 might include communication of a third product modification 402C and a fourth product modification 402D.

The product modifications 402 may include a communication, data, software, a command signal, etc. that is configured to bring the endpoint 106 back into compliance with the defined state. For example, the product modifications 402 may include a product update to a product 115 installed at the endpoint 106. The product update may include the latest version or upgrade to the product 115, which may be implemented at the endpoint 106 to change the product 115 or feature thereof. In this example, the trigger event might include publication of a CVE that is relevant to the product 115. The defined state of the endpoint 106 might dictate that the product 115 is to be maintained at an up-to-date status. Publication of the CVE may thus, place the endpoint 106 in a non-compliant status relative to the defined state. Accordingly, the product modification 402 may include the product update that addresses the CVE and brings the product 115 up to date.

The modification process 400 may extend or broadly apply a modification action of the modification process 400. As described above, the implementation modules 414 may interact with the scan modules 416 to identify other endpoints 106 that may be out of compliance with a defined state or may otherwise be subject to an issue related to a trigger event. Responsive to identification of the other endpoints 106 that are out of compliance with the defined state, the implementation modules 414 may implement the modification action at the identified endpoints 106. In some embodiments, the kernel driver 119 or the agent 123 may be configured to implement, at least partially, the product modification 402 at the endpoints 106 or otherwise enforce the defined states. For instance, the implementation modules 414 may implement the product modification 402 at another managed network 110, which may be unrelated to a managed network 110 in which the trigger event is detected, in another product 115 which may be unrelated to a product 115 in which the trigger event is detected, at another endpoint 106 which may be unrelated to an endpoint 106 in which the trigger event is detected, or some combination thereof.

For instance, in the example above with the product update, a scan initiated by the first management device 102 and/or the cloud server 122 may determine that a managed endpoint in the second managed network 110B or the one or more other endpoints 106 in the first managed network 110A may also include the product 115 that is related to the CVE. Accordingly, the implementation module 414 of the first management device 102 or the cloud server 122 may communicate the product modification 402 to the one or more other endpoints 106 and/or the second managed network 110B.

In another example, the trigger message may include a message communicated from the kernel driver 119 indicating that an unauthorized product is loaded onto the endpoint 106. For instance, a user of the endpoint 106 may be loading the product 115 outside of expressed authorization or operation of the first management device 102. In this example, the product modification 402 may include removal of the unauthorized product or disabling the unauthorized product. Additionally or alternatively, the product modification 402 may include a notification to the use of the endpoint 106 that indicates the disablement or removal process. In these and other embodiments, the kernel driver 119 or the agent 123 may be configured to implement, at least partially, the product modification 402.

The scan module 416 may aggregate or compile compliance data 411. The compliance data 411 includes a data representative of whether one or more scanned endpoints 106 are in or out of compliance with the defined state at a time of an implemented scan. The compliance data 411 may indicate a number of the scanned endpoints that have not received a product update or a number of endpoints that have not implemented a security feature, for instance. The compliance data 411 may be used to provide a real time or a substantially real time (e.g., without material delay) assessment of the scanned endpoints.

In some embodiments, the compliance data 411 may be associated with a defined subset or group of endpoints 106. The group might include a particular type of endpoint 106, endpoints 106 associated with a particular role in an enterprise, endpoints 106 used for a particular function, endpoints 106 in a particular jurisdiction, endpoints 106 with a particular hardware or accessory, endpoints 106 associated with a particular entity, other common characteristics, or combinations thereof. Additionally, the group may include managed endpoints 106 in the first managed network 110A, in the first and second managed networks 110A and 110B, the distribution server 112, or some combination or subset thereof.

In some embodiments, the group may be dynamic, which indicates the endpoints 106 of the group might change based on changing characteristics. In dynamic groups, the endpoints 106 in the group may be determined at a time a scan is performed, immediately preceding the scan, at a time in which the trigger event is detected, following the trigger event detection, or another suitable time. For instance the group may be defined over a range of domains, a range of IP addresses, an organizational unit, a geographic region or location, and the like.

Figure 8:
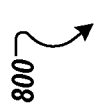
FIG. 8 depicts a block diagram of a portion of a user interface displaying an example set of groups that may be defined and implemented in the modification process of FIG. 4.

FIG. 8 depicts a block diagram 800 of a portion of a user interface displaying an example set of groups that may be defined and implemented in the modification process 400 of FIG. 4 or other suitable processes. In the diagram 800, multiple group names 802 represent groups defined in a particular network of endpoints (e.g., 106). For instance, each group might include a subset of the endpoints included in the particular network. The group names 802 are show along with a group type 804. The group names 802 are each associated with one or more managed endpoints (e.g., 106). In the embodiment of FIG. 8, the group type 804 includes 'dynamic' or 'static.' A static group may be formed based on one or more particular internet protocol (IP) addresses, one or more particular domains, one or more particular users, and the like. A dynamic group may include an IP range, a domain group, may be based on some metadata or category of metadata, organizational unit (OU), and the like.

Additionally, the diagram 800 includes a patch group type portion 806. Patch group type may indicate or be used to associate a patch group type for each of the groups. In some embodiments, the patch group type may be related to an automatic or pre-authorized action that may be implemented in the group. For instance, the "engineering" group may be characterized as "critical." Accordingly, an overall patch policy may automatically deploy product updates to endpoints included in the "engineering" group. Alternately, the "engineering" group may be characterized as "low." Accordingly, the overall patch policy may delay deployment of product updates to endpoints included in the "engineering" group.

Figure 5:
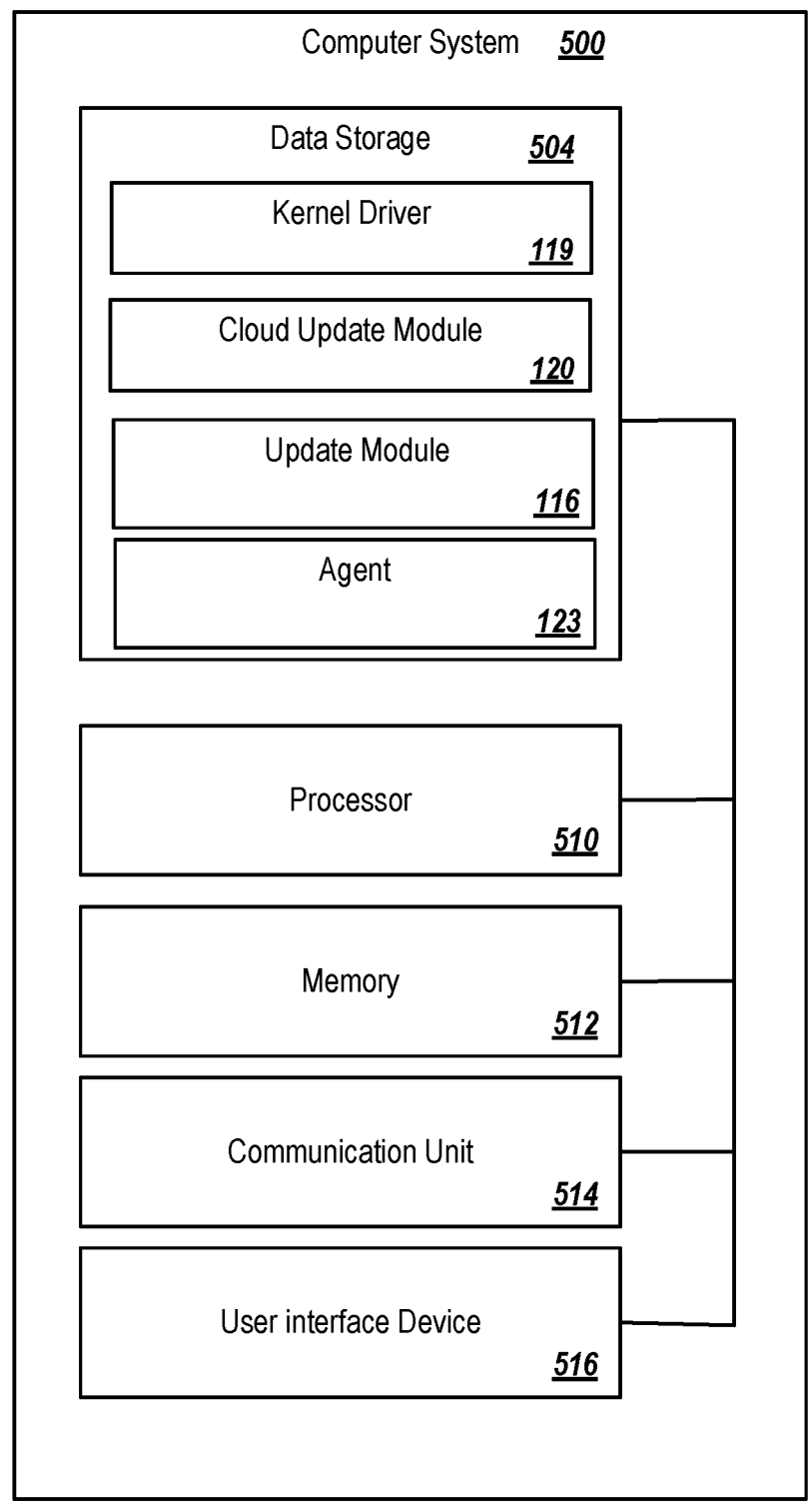
FIG. 5 illustrates an example computer system configured for automated software management.

Referring back to FIG. 4, the compliance data 411 may be processed and displayed in a user interface such as the user interface device 516 of FIG. 5. For example, the compliance data 411 may indicate whether the scanned endpoints 106 are compliant or non-compliant at the time of the scan. Additionally, a percentage or portion of compliant endpoints 106 might be determined. The compliance data 411 may then be plotted or displayed to indicate a compliance state over time.

FIG. 9 depicts a block diagram 900 of a portion of a user interface in which compliance data such as the compliance data 411 of FIG. 4 are displayed. In the diagram 900, a report set 902 indicates the defined group with which the compliance data is displayed. A compliance score 904 may indicate a percentage of the scanned endpoints (e.g., 106) in the group that are complaint with an applicable defined state. Group compliance history 906 graphically depicts the compliance data 411 plotted as a function of time. In the example diagram 900 a first line 908 indicates a compliance standard and a second line 910 indicates a compliance level over time. The plots in the group compliance history 906 are plotted as a function of time and a date (e.g., 912) on which the plot started.

Referring back to FIG. 4, in some embodiments the compliance data 411 may be related to a service level agreement (SLA) or another operational standard. The SLA or the other operational standard may define a level of expected service and one or more metrics to measure the level of expected service. For instance, an example of the level of expected service may include a percentage of the endpoints 106 that include a specific version of a software (e.g., 95% of client-support devices having the version and 70% of test devices having the version).

In these and other embodiments, the defined state may be based on or related to the SLA. For example, conditions in the defined state may be metrics of the SLA. Accordingly, the groups may be SLA groups, which include endpoints on which the SLA is measured. Additionally, the compliance data 411 may include SLA compliance data that indicates which of the scanned endpoints are SLA compliant or SLA non-compliant at the time of the scan. Moreover, the diagram 900 of FIG. 9 may depict SLA compliance as a function of time of SLA groups. Some additional details of the SLA assessment are provided in FIG. 7.

FIG. 5 illustrates an example computer system 500 configured for automated product update analysis and management, according to at least one embodiment of the present disclosure. The computer system 500 may be implemented in the operating environment 100 of FIG. 1, for instance. Examples of the computer system 500 may include the management device 102, the endpoint 106, the third-party server 104, or some combination thereof. The computer system 500 may include one or more processors 510, a memory 512, a communication unit 514, a user interface device 516, and a data storage 504 that includes the update module 116, the cloud update module 120, the agent 123, and the kernel driver 119 (collectively, modules 116/120/119/123).

The processor 510 may include any suitable special-purpose or general-purpose computer, computing entity, or processing device including various computer hardware or software modules and may be configured to execute instructions stored on any applicable computer-readable storage media. For example, the processor 510 may include a microprocessor, a microcontroller, a digital signal processor (DSP), an ASIC, an FPGA, or any other digital or analog circuitry configured to interpret and/or to execute program instructions and/or to process data. Although illustrated as a single processor in FIG. 5, the processor 510 may more generally include any number of processors configured to perform individually or collectively any number of operations described in the present disclosure. Additionally, one or more of the processors 510 may be present on one or more different electronic devices or computing systems. In some embodiments, the processor 510 may interpret and/or execute program instructions and/or process data stored in the memory 512, the data storage 504, or the memory 512 and the data storage 504. In some embodiments, the processor 510 may fetch program instructions from the data storage 504 and load the program instructions in the memory 512. After the program instructions are loaded into the memory 512, the processor 510 may execute the program instructions.

The memory 512 and the data storage 504 may include computer-readable storage media for carrying or having computer-executable instructions or data structures stored thereon. Such computer-readable storage media may include any available media that may be accessed by a general-purpose or special-purpose computer, such as the processor 510. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 510 to perform a certain operation or group of operations.

The communication unit 514 may include one or more pieces of hardware configured to receive and send communications. In some embodiments, the communication unit 514 may include one or more of an antenna, a wired port, and modulation/demodulation hardware, among other communication hardware devices. In particular, the communication unit 514 may be configured to receive a communication from outside the computer system 500 and to present the communication to the processor 510 or to send a communication from the processor 510 to another device or network (e.g., the network 121 of FIG. 1).

The user interface device 516 may include one or more pieces of hardware configured to receive input from and/or provide output to a user. In some embodiments, the user interface device 516 may include one or more of a speaker, a microphone, a display, a keyboard, a touch screen, or a holographic projection, among other hardware devices.

The modules 116/120/119/123 may include program instructions stored in the data storage 504. The processor 510 may be configured to load the modules 116/120/119/123 into the memory 512 and execute the modules 116/120/119/123. Alternatively, the processor 510 may execute the modules 116/120/119/123 line-by-line from the data storage 504 without loading them into the memory 512. When executing the modules 116/120/119/123, the processor 510 may be configured to perform one or more processes or operations described elsewhere in this disclosure.

Modifications, additions, or omissions may be made to the computer system 500 without departing from the scope of the present disclosure. For example, in some embodiments, the computer system 500 may not include the user interface device 516. In some embodiments, the different components of the computer system 500 may be physically separate and may be communicatively coupled via any suitable mechanism. For example, the data storage 504 may be part of a storage device that is separate from a device, which includes the processor 510, the memory 512, and the communication unit 514, that is communicatively coupled to the storage device. The embodiments described herein may include the use of a special-purpose or general-purpose computer including various computer hardware or software modules, as discussed in greater detail below.

Figure 6:
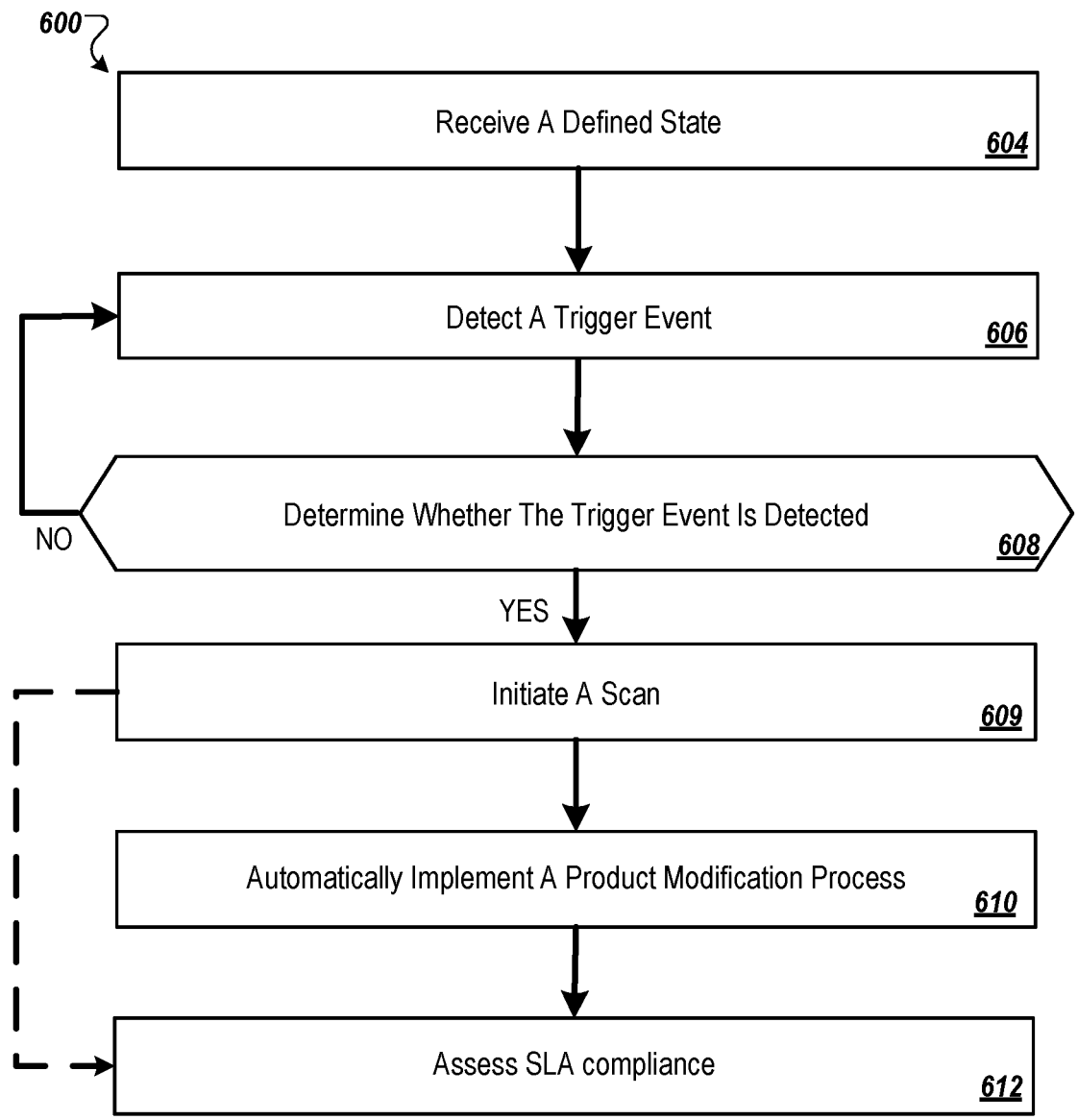
FIG. 6 is a flow chart of an example method of product management in a managed network.

FIG. 6 is a flow chart of an example method 600 of product management in a managed network, according to at least one embodiment of the present disclosure. The method 600 may be implemented for vulnerability detection and mitigation or other management operations in the managed network, for instance.

The method 600 may begin at block 604, in which a defined state or data indicative of the defined state may be received. The defined state may be associated with one or more products such as software programs, software products, operating systems, settings or configurations on endpoints, or combinations thereof. The products may be installed on one or more managed endpoints of a managed network. In some embodiments, the defined state includes a condition or constraint of the products or the endpoint. The condition or constraint may include a product update status (e.g., maintain the product in an up-to-date status), a product version preference, a preferred product being installed at the managed endpoint, a vendor update installation status, another suitable condition or constraint, or some combination thereof.

At block 606, a trigger event may be detected. The trigger event may be detected in the managed network or a cloud network that includes or is associated with the managed network. The trigger event being indicative of a change to the managed endpoint or to the product that is inconsistent with the defined state. In some embodiments, detection of the trigger event may include monitoring a software management interface that documents product inventory of the managed network. Additionally or alternatively, the detecting the trigger event may include communication with a kernel driver or an agent installed at the managed endpoint that is configured to monitor software inventory changes at the managed endpoint.

In some embodiments, the method 600 may be performed at least partially in the cloud network. In these and other embodiments, the trigger event may be detected in a portion of the cloud network that is not associated with the managed network. For instance, the trigger event may be detected in a portion of the cloud network associated with another managed network, a third-party server, a vendor server, another source, or some combination thereof.

Some examples of the trigger event may include an update to content or to the product, a notification by a service in a cloud network that is pushed to the managed endpoint, the notification indicating that content has been updated, an update published to a patch catalog, a boot or reboot (e.g., of an endpoint 106), a particular period of time (e.g., 1, 2, or 3 days) without a reboot, an upcoming deployment of a patch update (e.g., one hour before), an upcoming staging, an upcoming upload of critical content, an unauthorized change to a software inventory of the managed endpoint in the managed network, an unauthorized change to a software inventory of an additional managed endpoint having a similar defined state, another event indicating an inconsistency with the defined state, or some combination thereof.

At block 608, it may be determined whether the trigger event is detected. Responsive to the trigger event not being detected ("NO" at block 608), the method 600 may precede to block 606. From block 606, the method 600 may proceed through one or more of the blocks (608, 609, 610, 612, or combinations thereof) described with reference to FIG. 6. For instance, the operation of block 608 may be continuously or repeatedly performed until the trigger event is detected.

Responsive to the trigger event being detected ("YES" at block 608), the method 600 may precede to block 609. At block 609, a scan may be initiated. For instance, a local scan, a network scan, a global scan, or some combination thereof may be initiated. The local scan, the network scan, the global scan, or some combinations thereof may be automated, which may be performed without action by a user or an administrator. The local scan may be performed at the managed endpoint relative to one or more other products installed thereon. The network scan may include a scan of some or all endpoints on a managed network. The global scan may include a scan of some or all components (e.g., endpoints and products on the endpoints) of the cloud network. The scan may be performed to identify trigger events or other inconsistencies with the defined state throughout the managed network or the cloud network.

At block 610, a product modification process may be automatically implemented. The product modification process may include distribution of at least one product update to a first product installed at the managed endpoint. The product update may include a patch, version update, vulnerability fix, and the like. Additionally or alternatively, the product modification process may be configured to remove an installed product, replace an installed product, change to a setting or feature on an installed product, etc.

At block 612, SLA compliance may be assessed. For instance, in some embodiments, the defined state may at least partially include a service level agreement (SLA). In these and other embodiments, the at least one condition of the defined state includes a metric used to measure compliance with the SLA. The scan of block 609 may result in SLA compliance data at a time of the scan. The SLA compliance data may be display or otherwise processed to provide real-time or substantially SLA compliance regarding compliance with the SLA.

In some embodiments, the method 600 may proceed from 609 to 612 without implementing the operations of block 610. For instance, an assessment of compliance may be wanted without necessarily correcting outstanding deficiencies. Additionally, in some embodiments, the method 600 may omit operations of block 612. For instance, when an assessment is not wanted or there is not an SLA related to the defined state.

In some embodiments, following the implementation of the product modification process relative to a first product, the method 600 may include an additional scan operation and an additional, related product modification process. For instance, the method 600 may proceed to block 609, where some additional scan operations may be initiated. Based on the additional scan, an additional product modification process may be implemented. The additional product modification process may be implemented on an additional endpoint, an additional managed network, throughout the cloud, etc.

Figure 7:
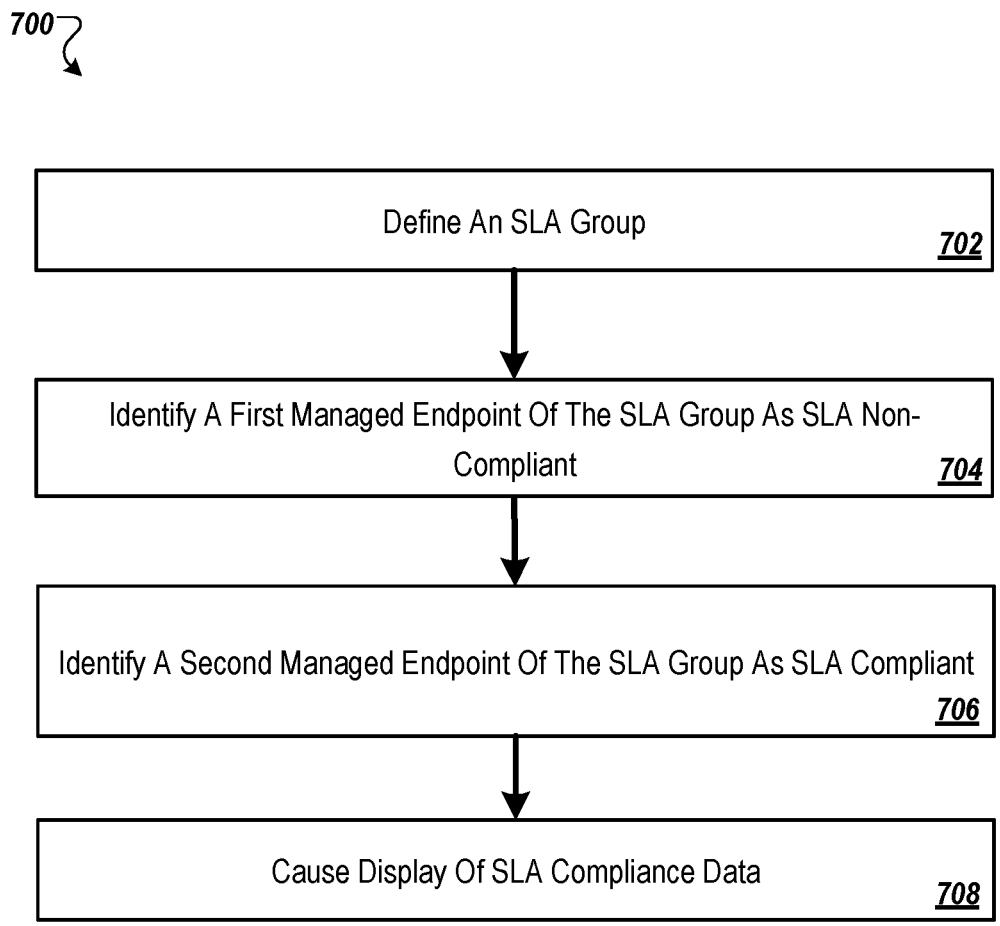
FIG. 7 is a flow chart of an example method of assessing real-time SLA compliance.

FIG. 7 is a flow chart of an example method 700 of assessing real-time SLA compliance according to at least one embodiment of the present disclosure. The method 700 may be implemented as part of another method or process such as block 612 of the method 600. For example, in embodiments of the method 600 in which the defined state at least partially includes an SLA, the method 700 may be included in block 612. In these and other embodiments, at least one condition of the defined state may include a metric used to measure compliance with the SLA. Additionally or alternatively the method 700 may be implemented independently.

The method 700 may begin at block 702 in which an SLA group may be defined. The SLA group may include a subset of managed endpoints. The subset of managed endpoints might include a particular type of endpoint (e.g., endpoints running iOS, mobile devices, etc.), endpoints associated with a particular role in an enterprise (e.g., engineers, executives), endpoints used for a particular function (e.g., testing, security, research and development), endpoints in a particular jurisdiction, endpoints with a particular hardware or accessory (e.g., data centers with external connectors), endpoints associated with a particular entity, other common characteristics, or combinations thereof. Additionally, the SLA group may include managed endpoints in a single managed network, which may be associated with a single entity such as an enterprise. in multiple managed networks, which may be related to two or more entities, in an entire global network, etc.

In some embodiments, the SLA group may be dynamic. That is, the specific endpoints included in the SLA group might fluctuate, or change based on changing characteristics. The SLA group may be defined according to one or more characteristics (e.g., device type, function, role, jurisdiction, etc.). At a time in which the method 700 is implemented, the SLA group may be defined in essentially real time based on data related to the defining characteristic of the SLA group. For example, the SLA group may be based on jurisdiction. At the time the method 700 is implemented, location data may be processed to determine which endpoints are included in the SLA group. In some embodiments, multiple SLA groups may be defined. In these and other embodiments, one or more of the SLA groups may be static and one or more SLA groups may be dynamic.

At block 704, a first managed endpoint of the SLA group may be identified as SLA non-compliant. For instance, in some embodiments a scan such as the scan of block 609 of the method 600 may be implemented. The first managed endpoint may be identified as SLA non-compliant responsive to the scan identifying at least one condition being inconsistent with the defined state.

At block 706, a second managed endpoint of the SLA group may be identified as SLA compliant. For instance, in some embodiments a scan such as the scan of block 609 of the method 600 may be implemented. The second managed endpoint may be identified as SLA compliant responsive to the scan identifying the conditions being consistent with the defined state.

At block 708, display of SLA compliance data may be caused. The SLA compliance data includes data representative of whether managed endpoints of the SLA group are SLA compliant or SLA non-compliant at a time of the scan. The display of the SLA compliance data may be caused in a user interface. The SLA compliance data may be displayed as a function of time. For instance the SLA compliance data during a first scan (e.g., first implementation of the method 700) may be plotted along with SLA compliance data during subsequent scans.

Further, modifications, additions, or omissions may be made to the methods 600 and 700 without departing from the scope of the present disclosure. For example, the operations of methods 600 and 700 may be implemented in differing order. Furthermore, the outlined operations and actions are only provided as examples, and some of the operations and actions may be optional, combined into fewer operations and actions, or expanded into additional operations and actions without detracting from the disclosed embodiments.

The methods 600 and 700 may be performed in a suitable operating environment such as the operating environment 100, one or both of the managed networks 110, and the cloud network 126 of FIG. 1. The methods 600 and 700 may be performed by one or both of the management devices 102 and the cloud server 122 described elsewhere in the present disclosure or by another suitable computing system, such as the computer system 500 of FIG. 5.

In some embodiments, the management devices 102, the cloud server 122, or the other computing system may include or may be communicatively coupled to a non-transitory computer-readable medium (e.g., the memory 512 of FIG. 5) having stored thereon programming code or instructions that are executable by one or more processors (such as the processor 510 of FIG. 5) to cause a computing system, the cloud server 122, or the management devices 102 to perform or control performance of the methods 600 or 700. Additionally or alternatively, the management devices 102 or the cloud server 122 may include the processor 510 that is configured to execute computer instructions to cause the management devices 102, the cloud server 122, or another computing systems to perform or control performance of the methods 600 and/or 700. The management device 102, the cloud server 122, or the computer system 500 implementing the methods 600 and/or 700 may be included in a cloud-based managed network (e.g., the cloud network 126), an on-premises system (e.g., implementing one of the managed networks 110), or another suitable network computing environment. Although illustrated as discrete blocks, one or more blocks in FIG. 6 may be divided into additional blocks, combined into fewer blocks, or eliminated, depending on the desired implementation.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data, which cause a general-purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

The various features illustrated in the drawings may not be drawn to scale. The illustrations presented in the present disclosure are not meant to be actual views of any particular apparatus (e.g., device, system, etc.) or method, but are representations employed to describe embodiments of the disclosure. Accordingly, the dimensions of the features may be expanded or reduced for clarity. In addition, some of the drawings may be simplified for clarity. Thus, the drawings may not depict all of the components of a given apparatus (e.g., device) or all operations of a particular method.

Terms used in the present disclosure and the claims (e.g., bodies of the appended claims) are intended as "open" terms (e.g., the term "including" should be interpreted as "including, but not limited to," the term "having" should be interpreted as "having at least," the term "includes" should be interpreted as "includes, but is not limited to," among others). Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in instances in which a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

The terms "first," "second," "third," etc., are not necessarily used to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art and are to be construed as being without limitation to such specifically recited examples and conditions. Although embodiments of the present inventions have been described in detail, it should be understood that the various changes, substitutions, and alterations could be made hereto without departing from the scope of the invention.

What is claimed is:

1. A method of vulnerability detection and mitigation in a managed network, the method comprising:
   receiving a defined state of a product on a managed endpoint of the managed network, the defined state including one or more conditions of the product;
   detecting a trigger event in the managed network, the trigger event being indicative of a circumstance that is inconsistent with the defined state;
   responsive to the detection of the trigger event, initiating a scan that includes an automated scan of the managed endpoint for a first condition of the one or more conditions at the managed endpoint, wherein; the scan includes an automated network scan of additional managed endpoints in the managed network, and the automated network scan is configured to identify presence of the trigger event in one or more of the additional managed endpoints;
   responsive to the automated scan identifying the first condition being inconsistent with the defined state, automatically implementing a product modification process, the product modification process including distribution of at least a control signal that is configured to change the product or the managed endpoint to bring the product or the managed endpoint into compliance with the defined state; and implementing the product modification process at a first additional managed endpoint of the additional managed endpoints responsive to the trigger event being present at the first additional managed endpoint.

2. The method of claim 1, wherein:

the managed network is hosted on a cloud network;

the scan includes an automated global scan of additional managed networks hosted on the cloud network;

the automated global scan is configured to identify presence of the trigger event in one or more of the additional managed networks; and implementing the product modification process at a first additional managed network responsive to the trigger event being present at the first additional managed network of the additional managed networks.

3. The method of claim 2, wherein:

the defined state includes a service level agreement (SLA);

the first condition includes a metric used to measure the SLA; and the method further comprises assessing real-time SLA compliance regarding the SLA.

4. The method of claim 3, wherein the assessing real-time SLA compliance includes:

responsive to the scan identifying the first condition being inconsistent with the defined state, identifying the managed endpoint, the first additional managed endpoint, or the first additional managed network as SLA non-compliant;

responsive to the scan identifying the first condition being consistent with the defined state, identifying the managed endpoint, the first additional managed endpoint, and the first additional managed network as SLA compliant; and cause display, in a user interface, of SLA compliance data as a function of time, wherein the SLA compliance data is representative of the managed endpoint, the first additional managed endpoint, and the first additional managed network as SLA compliant or SLA non-complaint at a time of the scan.

5. The method of claim 4, further comprising defining an SLA group including a subset of managed endpoints in one or both of the managed network and the additional managed networks, wherein:

the scan includes automated scans of the SLA group; and the SLA compliance data further includes data representative of whether each managed endpoint of the SLA group is SLA compliant or SLA non-complaint at a time of the scan.

6. The method of claim 2, wherein the trigger event is detected in a portion of the cloud network that is not associated with the managed network.

7. The method of claim 1, wherein the product modification process includes transmission of at least one product update to the product installed at the managed endpoint.

8. The method of claim 1, wherein the trigger event includes:

an update to content or to the product;

a notification by a service in a cloud network that is pushed to the managed endpoint, the notification indicating that content has been updated;

an update published to a patch catalog;

an unauthorized change to a software inventory of the managed endpoint in the managed network; or an unauthorized change to a software inventory of one or more of the additional managed endpoints having a similar defined state.

9. The method of claim 1, wherein the first condition of the product includes:

a product update status;

a product version preference;

a preferred product being installed at the managed endpoint;

a vendor update installation status; or an outstanding patches and vulnerabilities.

10. The method of claim 1, wherein the detecting includes monitoring a software management interface that records software inventory of the managed network.

11. The method of claim 1, wherein:

the detecting includes communicating with a kernel driver installed at the managed endpoint, and the kernel driver is configured to monitor software inventory changes at the managed endpoint.

12. Non-transitory computer-readable media having encoded therein programming code executable by one or more processors to perform or control performance of operations comprising:

receiving a defined state of a product on a managed endpoint of a managed network, the defined state including one or more conditions of the product;

detecting a trigger event in the managed network, the trigger event being indicative of a circumstance that is inconsistent with the defined state;

responsive to the detection of the trigger event, initiating a scan that includes an automated scan of the managed endpoint for a first condition of the one or more conditions at the managed endpoint, wherein; the scan includes an automated network scan of additional managed endpoints in the managed network, and the automated network scan is configured to identify presence of the trigger event in one or more of the additional managed endpoints;

responsive to the automated scan identifying the first condition being inconsistent with the defined state, automatically implementing a product modification process, the product modification process including distribution of at least a control signal that is configured to change the product or the managed endpoint to bring the product or the managed endpoint into compliance with the defined state; and implementing the product modification process at a first additional managed endpoint of the additional managed endpoints responsive to the trigger event being present at the first additional managed endpoint.

13. The non-transitory computer-readable media of claim 12, wherein:

the managed network is hosted on a cloud network;

the scan includes an automated global scan of additional managed networks hosted on the cloud network;

the automated global scan is configured to identify presence of the trigger event in one or more of the additional managed networks;

implementing the product modification process at a first additional managed network responsive to the trigger event being present at the first additional managed network of the additional managed networks; and the trigger event is detected in a portion of the cloud network that is not associated with the managed network.

14. The non-transitory computer-readable media of claim 13, wherein:

the defined state includes a service level agreement (SLA);

the first condition includes a metric used to measure the SLA; and the operations further comprise assessing real-time SLA compliance regarding the SLA.

15. The non-transitory computer-readable media of claim 14, wherein the assessing real-time SLA compliance includes:

responsive to the scan identifying the first condition being inconsistent with the defined state, identifying the managed endpoint, the first additional managed endpoint, or the first additional managed network as SLA non-compliant;

responsive to the scan identifying the first condition being consistent with the defined state, identifying the managed endpoint, the first additional managed endpoint, and the first additional managed network as SLA compliant; and cause display, in a user interface, of SLA compliance data as a function of time, wherein the SLA compliance data is representative of the managed endpoint, the first additional managed endpoint, and the first additional managed network as SLA compliant or SLA non-complaint at a time of the scan.

16. The non-transitory computer-readable media of claim 15, wherein:

the operations further comprising defining an SLA group including a subset of managed endpoints in one or both of the managed network and the additional managed networks;

the scan includes automated scans of the SLA group; and the SLA compliance data further includes data representative of whether each managed endpoint of the SLA group is SLA compliant or SLA non-complaint at a time of the scan.

17. The non-transitory computer-readable media of claim 12, wherein the product modification process includes transmission of at least one product update to the product installed at the managed endpoint.

18. The non-transitory computer-readable media of claim 12, wherein:

the trigger event includes:

an update to content or to the product;

a notification by a service in a cloud network that is pushed to the managed endpoint, the notification indicating that content has been updated;

an update published to a patch catalog;

an unauthorized change to a software inventory of the managed endpoint in the managed network; or an unauthorized change to a software inventory of one or more of the additional managed endpoints having a similar defined state; and the first condition of the product includes:

a product update status;

a product version preference;

a preferred product being installed at the managed endpoint;

a vendor update installation status; or an outstanding patches and vulnerabilities.

19. The non-transitory computer-readable media of claim 12, wherein the detecting includes:

monitoring a software management interface that records software inventory of the managed network; or communicating with a kernel driver installed at the managed endpoint that is configured to monitor software inventory changes at the managed endpoint.

* * * * *